United States Patent
Bae et al.

(10) Patent No.: US 10,464,558 B2
(45) Date of Patent: Nov. 5, 2019

(54) DRIVING ASSISTANCE APPARATUS FOR VEHICLE

(71) Applicant: LG ELECTRONICS INC., Seoul (KR)

(72) Inventors: Hyeonju Bae, Seoul (KR); Jeongsu Kim, Seoul (KR); Jinkyo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 15/649,211

(22) Filed: Jul. 13, 2017

(65) Prior Publication Data

US 2018/0015918 A1    Jan. 18, 2018

(30) Foreign Application Priority Data

Jul. 14, 2016   (KR) .......................... 10-2016-0089163

(51) Int. Cl.
*B60W 30/09*    (2012.01)
*B60W 10/04*    (2006.01)
(Continued)

(52) U.S. Cl.
CPC ............ *B60W 30/09* (2013.01); *B60W 10/04* (2013.01); *B60W 10/184* (2013.01);
(Continued)

(58) Field of Classification Search
CPC ............... B60W 30/09; B60W 30/085; B60W 30/0953; B60W 30/0956; B60W 30/16;
(Continued)

(56) References Cited

U.S. PATENT DOCUMENTS

| 2011/0015818 A1* | 1/2011 | Breuer | B60T 8/17558 |
| | | | 701/31.4 |
| 2011/0227713 A1* | 9/2011 | Amann | B60W 30/0953 |
| | | | 340/435 |

(Continued)

FOREIGN PATENT DOCUMENTS

| DE | 102011012793 | 9/2012 |
| DE | 102013019202 | 5/2015 |

(Continued)

OTHER PUBLICATIONS

Extended European Search Report in European Application No. 17001182.9, dated Dec. 14, 2017, 8 pages (with English translation).

*Primary Examiner* — Aaron L Troost
(74) *Attorney, Agent, or Firm* — Fish & Richardson P.C.

(57) ABSTRACT

A vehicle driving assistance apparatus includes a sensing unit configured to sense an object outside a vehicle, and a processor. The processor is configured to obtain surrounding situation information, determine whether the object approaches the vehicle from a traveling lane or a lateral lane based on a location of the object outside the vehicle, and generate a control signal to control at least one of a drive apparatus of the vehicle, a steering apparatus of the vehicle, or a brake apparatus of the vehicle. The vehicle driving assistance apparatus enables the vehicle (i) to avoid collision between the vehicle and the object or (ii) to perform an action that reduces an impulse on the vehicle from the collision, and provide the control signal to a vehicle control system of the vehicle.

21 Claims, 21 Drawing Sheets

(51) Int. Cl.
  *B60W 10/184* (2012.01)
  *B60W 10/20* (2006.01)
  *B60W 30/095* (2012.01)
  *B60W 30/16* (2012.01)
  *B60W 50/00* (2006.01)
  *B60W 50/16* (2012.01)
  *G05D 1/02* (2006.01)
  *B60W 50/12* (2012.01)
  *B60W 50/14* (2012.01)
  *B60W 30/085* (2012.01)
  *B60W 30/08* (2012.01)

(52) U.S. Cl.
  CPC .......... *B60W 10/20* (2013.01); *B60W 30/085* (2013.01); *B60W 30/0953* (2013.01); *B60W 30/0956* (2013.01); *B60W 30/16* (2013.01); *B60W 50/0097* (2013.01); *B60W 50/12* (2013.01); *B60W 50/14* (2013.01); *B60W 50/16* (2013.01); *G05D 1/0289* (2013.01); *B60W 2030/082* (2013.01); *B60W 2050/143* (2013.01); *B60W 2050/146* (2013.01); *B60W 2520/04* (2013.01); *B60W 2520/10* (2013.01); *B60W 2540/12* (2013.01); *B60W 2550/10* (2013.01); *B60W 2550/308* (2013.01); *B60W 2550/408* (2013.01); *B60W 2720/10* (2013.01); *B60W 2750/308* (2013.01); *B60W 2750/40* (2013.01)

(58) Field of Classification Search
  CPC .... B60W 10/04; B60W 10/184; B60W 10/20; B60W 50/0097; B60W 50/12; B60W 50/14; B60W 50/16; B60W 2030/082; B60W 2050/143; B60W 2050/146; B60W 2520/04; B60W 2520/10; B60W 2540/12; B60W 2550/10; B60W 2550/308; B60W 2550/408; B60W 2720/10; B60W 2750/308; B60W 2750/40; G05D 1/0289
  See application file for complete search history.

(56) References Cited

U.S. PATENT DOCUMENTS

2017/0001636 A1* 1/2017 Laur ..................... B60W 30/09
2018/0362033 A1* 12/2018 Newman ........... B60W 30/0956

FOREIGN PATENT DOCUMENTS

| | | |
|---|---|---|
| JP | 2007034988 | 2/2007 |
| JP | 2008162553 | 7/2008 |
| JP | 2008293095 | 12/2008 |
| JP | 2012108706 | 6/2012 |
| JP | 2015101240 | 6/2015 |
| JP | 2015212115 | 11/2015 |
| JP | 2016068750 | 5/2016 |
| JP | 2016126701 | 7/2016 |
| KR | 10-2013-0013997 | 2/2013 |
| KR | 10-2013-0074194 | 7/2013 |
| KR | 10-2014-0128800 | 11/2014 |
| KR | 10-2015-0044134 | 4/2015 |
| KR | 101519287 | 5/2015 |
| KR | 10-2016-0062420 | 6/2016 |
| WO | 2015/188904 | 12/2015 |

* cited by examiner (b)

(a)

(b)

(a)

DRIVING ASSISTANCE APPARATUS FOR VEHICLE

CROSS-REFERENCE TO RELATED APPLICATION

This application claims the priority benefit of Korean Patent Application No. 10-2016-0089163, filed on Jul. 14, 2016 in the Korean Intellectual Property Office, the disclosure of which is incorporated herein by reference.

TECHNICAL FIELD

The present invention relates to a driving assistance apparatus installed in a vehicle.

BACKGROUND

A vehicle refers to an apparatus that a user drives in a desired direction. A typical example of the vehicle is an automobile.

For convenience of vehicle users, the vehicle has increasingly been equipped with various sensors and electrical devices. In particular, various devices for driver convenience are under development.

As the vehicle is equipped with various electronic devices, multiple convenience devices or systems are installed in the vehicle.

Meanwhile, there is an Autonomous Emergency Braking (AEB) system according to the prior art to automatically brake a vehicle so that the vehicle does not collide with a preceding vehicle while traveling in a situation in which collision between the vehicle and the preceding vehicle is expected.

However, the AEB system cannot prevent collision with a vehicle approaching from the back after a vehicle stops.

Accordingly, a vehicle driving assistance apparatus for preventing a vehicle which stops while traveling from colliding with a vehicle approaching from the back is under study.

SUMMARY

Therefore, the present invention has been made in view of the above problems, and it is an object of the present invention to provide a vehicle driving assistance apparatus for vehicle control so as to prevent a vehicle which stops while traveling from colliding with a vehicle approaching from behind.

Another object of the present invention is to provide a vehicle driving assistance apparatus for displaying a last point to brake or a last point to steer while a vehicle travels and providing a guide for the last point to brake or the last point to steer to a driver.

The objects of the present invention are not limited to what has been particularly described hereinabove and other objects not described herein will be more clearly understood by persons skilled in the art from the following description.

In accordance with an aspect of the present invention, the above and other objects can be accomplished by the provision of a vehicle driving assistance apparatus installed in a vehicle, including a sensing unit configured to sense an object outside the vehicle, and a processor configured to provide, based on acquired surrounding situation information, a signal for controlling at least one of a driving apparatus, a steering apparatus, and a brake apparatus of the vehicle to prevent collision between the vehicle and the object or to minimize impulse exerted on the vehicle during collision, upon determining that the object sensed by the sensing unit approaches from a traveling lane or a lateral lane of the vehicle.

Details of other embodiments are included in the following description and the drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
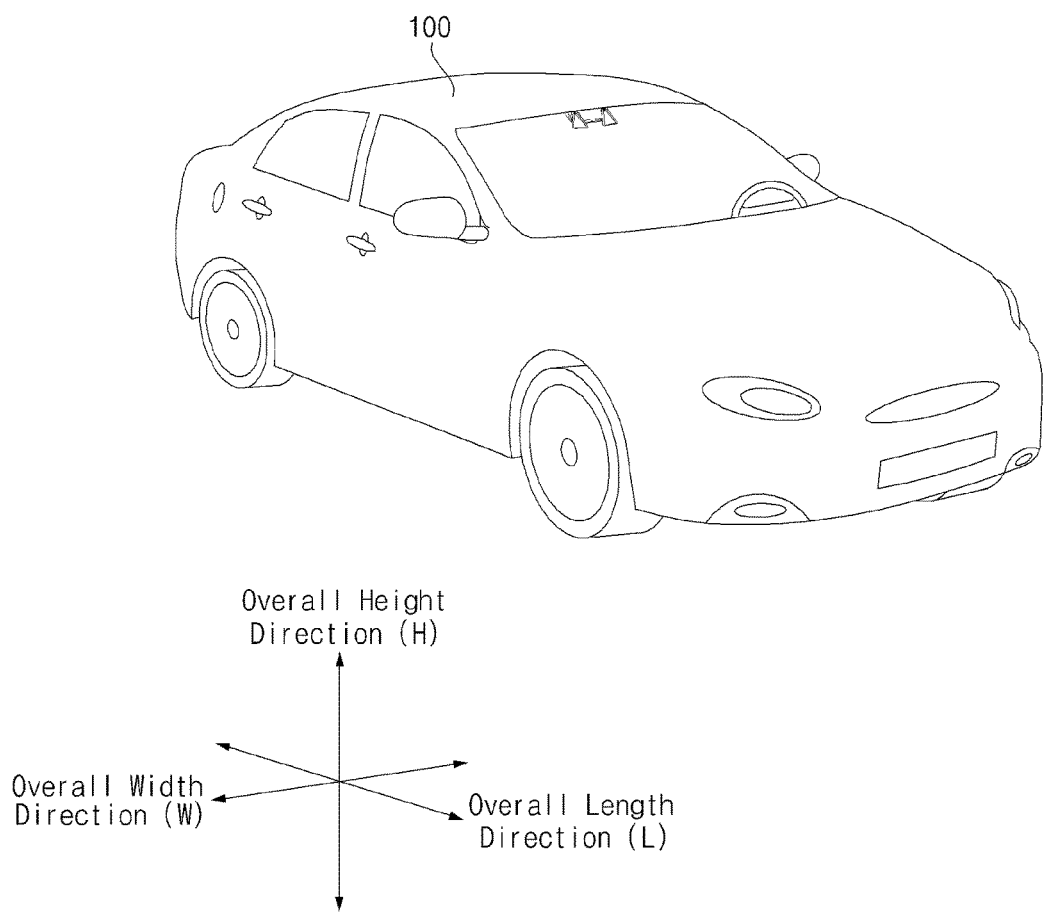
FIG. 1 is a view illustrating an outer appearance of a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given only in consideration only facilitation of description and do not have particular meanings or functions. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

The singular form is intended to include the plural forms as well, unless context clearly indicates otherwise.

In the present application, it will be further understood that the terms "comprises", "includes", etc. specify the presence of stated features, numerals, steps, operations, elements, components, or combinations thereof, but do not preclude the presence or addition of one or more other features, numerals, steps, operations, elements, components, or combinations thereof.

The term "vehicle" employed in this specification may include an automobile or a motorcycle. Hereinafter, description will be given mainly focusing on an automobile.

The vehicle described in this specification may include an internal combustion vehicle equipped with an engine as a power source, a hybrid vehicle equipped with both an engine and an electric motor as a power source, and an electric vehicle equipped with an electric motor as a power source.

In the description below, the left side of the vehicle means the left side with respect to the traveling direction of the vehicle and the right side of the vehicle means the right side with respect to the traveling direction of the vehicle.

FIG. 1 is a view illustrating an outer appearance of a vehicle according to an embodiment of the present invention.

Referring to FIG. 1, a vehicle 100 may include wheels rotated by a power source and a steering apparatus for adjusting the traveling direction of the vehicle 100.

The vehicle 100 may include a vehicle driving assistance apparatus 200.

The vehicle driving assistance apparatus 200 may prevent collision which may occur after the vehicle 100 stops. The vehicle driving assistance apparatus 200 may provide a signal for controlling movement of the vehicle 100 so that the vehicle 100 may not collide with an approaching object when the vehicle 100 stops while traveling. The vehicle 100 may move not to collide with the object in correspondence with the signal.

If the vehicle 100 invades a lateral lane while stopping, the vehicle driving assistance apparatus 200 may provide a signal for controlling the vehicle 100 so that the vehicle 100 may return to an original traveling lane. The vehicle driving assistance apparatus 200 may prevent collision between the vehicle 100 and another vehicle 100 approaching from the lateral lane.

The vehicle driving assistance apparatus 200 may display at least one of a Last-Point-To-Brake (LPB) and a Last-Point-To-Steer (LPS) to prevent collision between the vehicle 100 and a preceding object while the vehicle 100 travels. The vehicle driving assistance apparatus 200 may request that a user perform braking input or steering change input within a set time starting from a time at which the vehicle 100 reaches the LPB or the LPS.

According to an embodiment, the vehicle 100 may be an autonomous vehicle. The autonomous vehicle may switch a traveling mode to an autonomous mode or a manual mode according to user input. In the manual mode, the autonomous vehicle may receive steering change input through the steering apparatus.

An overall length refers to a length from the front part to the rear part of the vehicle 100, an overall width refers to a width of the vehicle 100, and an overall height refers to a length from the bottom of a wheel to a roof of the vehicle 100. In the following description, an overall length direction L may mean a reference direction for measuring the overall length of the vehicle 100, an overall width direction W may mean a reference direction for measuring the overall width of the vehicle 100, and an overall height direction H may mean a reference direction for measuring the overall height of the vehicle 100.

Figure 2:
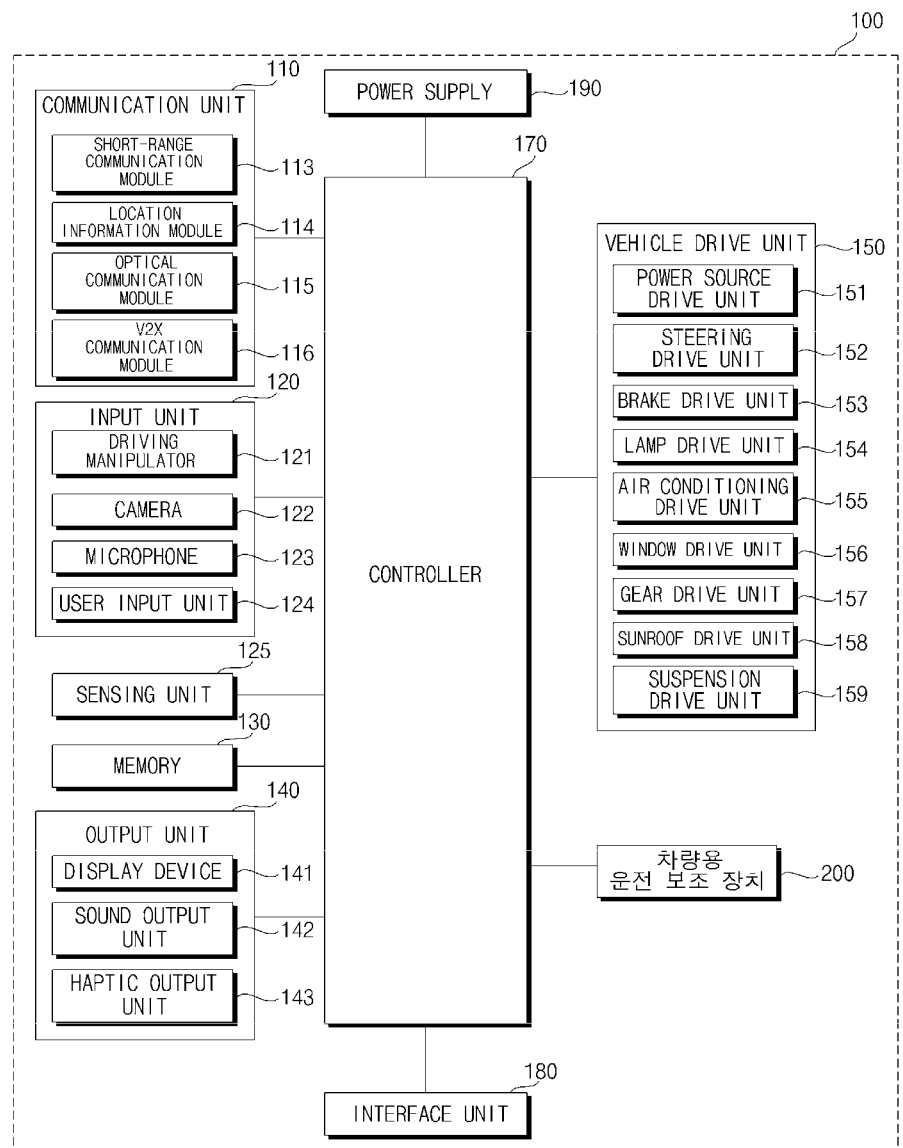
FIG. 2 is a block diagram illustrating a vehicle according to an embodiment of the present invention.

FIG. 2 is a block diagram illustrating a vehicle according to an embodiment of the present invention.

Referring to FIG. 2, the vehicle 100 may include a communication unit 110, an input unit 120, a sensing unit 125, a memory 130, an output unit 140, a vehicle drive unit 150, a controller 170, an interface unit 180, a power supply 190, and a vehicle driving assistance apparatus 200.

The communication unit 110 may include a short-range communication module 113, a location information module 114, an optical communication module 115, and a Vehicle-to-X (V2X) communication module 116.

The short-range communication module 113, which is used for short-range communication, may support short-range communication using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, and Wireless Universal Serial Bus (USB) technologies.

The short-range communication module 113 may establish a wireless local area network to implement short-range communication between the vehicle 100 and at least one external device. For example, the short-range communication module 113 may wirelessly exchange data with a mobile terminal. The short-range communication module 113 may receive weather information and traffic state information (e.g., Transport Protocol Experts Group (TPEG)) from the mobile terminal. For example, when a user rides in the vehicle 100, the mobile terminal of the user may be paired with the vehicle 100 automatically or by execution of an application by the user.

The location information module 114 serves to acquire the location of the vehicle 100 and a typical example thereof is a Global Positioning System (GPS) module. As an example of using the GPS module, the location of the vehicle 100 may be acquired using a signal transmitted from a GPS satellite.

According to an embodiment, the location information module 114 may be a constituent included in the sensing unit 125 rather than in the communication unit 110.

The optical communication module 115 may include a light transmitter and a light receiver.

The light receiver may receive information by converting a light signal into an electrical signal. The light receiver may include a Photodiode (PD) for receiving light. The PD may convert light into an electrical signal. For example, the light receiver may receive information regarding a preceding vehicle through light emitted from a light source included in the preceding vehicle.

The light transmitter may include at least one light emitting device for converting an electrical signal into a light signal. The light emitting device is desirably a Light Emitting Diode (LED). The light transmitter externally emits a light signal by converting an electrical signal into the light signal. For example, the light transmitter may externally emit the light signal through flickering of the light emitting device at a predetermined frequency. According to an embodiment, the light transmitter may include an array of a plurality of light emitting devices. According to an embodiment, the light transmitter may be incorporated into a lamp included in the vehicle 100. For example, the light transmitter may be at least one of a headlight, a taillight, a brake lamp, a turn signal lamp, and a sidelight.

For example, the optical communication module 115 may exchange data with another vehicle through optical communication.

The V2X communication module 116 performs wireless communication with a server or another vehicle. The V2X module 116 includes a module for implementing a Vehicle-to-Vehicle (V2V) or Vehicle-to-Infrastructure (V2I) communication protocol. The vehicle 100 may perform wireless communication with an external server and another vehicle through the V2X communication module 116.

The input unit 120 may include a driving manipulator 121, a microphone 123, and a user input unit 124.

The driving manipulator 121 receives user input for driving the vehicle 100. The driving manipulator 121 may include a steering apparatus, a shift input apparatus, an acceleration input apparatus, and a brake input apparatus.

The steering apparatus receives input for steering of the vehicle 100 from a user. The steering apparatus is desirably formed in the shape of a wheel to allow steering input through rotation. According to an embodiment, the steering apparatus may be configured as a touchscreen, a touch pad, or a button.

The shift input apparatus receives, from the user, input for one of Park (P), Drive (D), Neutral (N), and Reverse (R) gears of the vehicle 100. Desirably, the shift input apparatus is formed in the shape of a lever. According to an embodiment, the shift input apparatus may be configured as a touchscreen, a touch pad, or a button.

The acceleration input apparatus receives input for accelerating the vehicle 100 from the user. The brake input apparatus receives input for decelerating the vehicle 100 from the user. Desirably, the acceleration input apparatus and the brake input apparatus are formed in the shape of a pedal. According to an embodiment, the acceleration input apparatus or the brake input apparatus may be configured as a touchscreen, a touch pad, or a button.

The microphone 123 may process an external sound signal into electrical data. The processed data may be utilized in various ways according to a function that the vehicle 100 is performing. The microphone 123 may convert a user voice command into electrical data. The converted electrical data may be transmitted to the controller 170.

According to an embodiment, a camera or the microphone 123 may be a constituent included in the sensing unit 125 rather than in the input unit 120.

The user input unit 124 serves to receive information from the user. When information is input through the user input unit 124, the controller 170 may control operation of the vehicle 100 to correspond to the input information. The user input unit 124 may include a touch input means or a mechanical input means. According to an embodiment, the user input unit 124 may be disposed in one area of the steering wheel. In this case, the driver may manipulate the user input unit 124 with fingers while gripping the steering wheel.

The sensing unit 125 senses various situations of the vehicle 100 or external situations of the vehicle 100. To this end, the sensing unit 125 may include a collision sensor, a wheel sensor, a speed sensor, a tilt sensor, a weight sensor, a heading sensor, a yaw sensor, a gyro sensor, a position module, a vehicle forward/reverse sensor, a battery sensor, a fuel sensor, a tire sensor, a steering sensor based on turning of the steering wheel, a vehicle interior temperature sensor, a vehicle interior humidity sensor, an ultrasonic sensor, an illumination sensor, an acceleration pedal position sensor, and a brake pedal position sensor.

The sensing unit 125 may acquire sensing signals regarding vehicle collision information, vehicle direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, angle information based on turning of the steering wheel, vehicle exterior illumination information, acceleration pedal pressure information, and brake pedal pressure information.

The sensing unit 125 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, and a Crankshaft Angle Sensor (CAS).

Meanwhile, the location information module 114 may be classified as a constituent of the sensing unit 125.

The sensing unit 125 may include an object sensing unit for sensing an object located around the vehicle. The object sensing unit may include a camera module, a radar, a lidar, and an ultrasonic sensor. In this case, the sensing unit 125 may sense a preceding object located in front of the vehicle or a rear object located behind the vehicle through the camera module, the radar, the lidar or the ultrasonic sensor.

The sensing unit 125 may include the camera module. The camera module may include an external camera module for capturing an image of the exterior of the vehicle 100 and an internal camera module for capturing an image of the interior of the vehicle 100.

The external camera module may include one or more cameras for capturing an image of the exterior of the vehicle 100. The external camera module may include an Around View Monitoring (AVM) device, a Blind Spot Detection (BSD) device, or a rear view camera device.

The AVM device may synthesize a plurality of images acquired by a plurality of cameras to provide an image around the vehicle to the user. The AVM device may synthesize a plurality of images and convert the synthesized image into an image which is conveniently visible to the user. For example, the AVM device may synthesize a plurality of images and convert the synthesized images into a top-view image.

For example, the AVM device may include first to fourth cameras. In this case, the first camera may be located around a front bumper, a radiator grille, an emblem, or a windshield. The second camera may be located on a left side mirror, a left front door, a left rear door, or a left fender. The third camera may be located on a right side mirror, a right front door, a right rear door, or a right fender. The fourth camera may be located around a rear bumper, an emblem, or a license plate.

The BSD device may detect an object from the images acquired by one or more cameras and output an alarm upon determining that collision with the object may occur.

For example, the BSD device may include first and second cameras. In this case, the first camera may be disposed on a left side mirror, a left front door, a left rear door, or a left fender. The second camera may be disposed on a right side mirror, a right front door, a right rear door, or a right fender.

The rear view camera device may include a camera for acquiring an image of the rear of the vehicle.

For example, the rear view camera device may be disposed near a rear bumper, an emblem, or a license plate.

The camera of the sensing unit 210 included in the vehicle driving assistance apparatus 200 may be a camera included in any one of the AVM device, the BSD device, and the rear view camera device included in the vehicle 100.

The memory 130 is electrically connected to the controller 170. The memory 130 may store basic data for each unit, control data for controlling operation of each unit, and input/output data. As hardware, the memory 130 may be various storage devices such as a Read Only Memory (ROM), a Random Access Memory (RAM), an Electrically Erasable Programmable Read Only Memory (EPROM), a flash drive, and a hard drive. The memory 130 may store various types of data for overall operation of the vehicle 100, such as a program for processing or controlling operation of the controller 170.

The output unit 140 serves to output information processed by the controller 170 and may include a display device 141, a sound output unit 142, and a haptic output unit 143.

The display device 141 may display various graphical objects. For example, the display device 141 may display vehicle-related information. Herein, the vehicle-related information may include vehicle control information for directly controlling the vehicle or vehicle driving assistance information for guiding a vehicle drive unit for driving of the vehicle. The vehicle-related information may also include vehicle condition information indicating the current condition of the vehicle or vehicle driving information related to driving of the vehicle.

The display device 141 may include at least one of a Liquid Crystal Display (LCD), a Thin Film Transistor (TFT) LCD, an Organic Light-Emitting Diode (OLED), a flexible display, a 3-dimensional (3D) display, and an e-ink display.

The display device 141 may implement a touchscreen by forming a layered structure together with a touch sensor or being incorporated into the touch sensor. Such touchscreen may serve as the user input unit 124 which provides an input interface between the vehicle 100 and the user and also as an output interface between the vehicle 100 and the user. In this case, the display device 141 may include a touch sensor for sensing touch applied to the display device 141 so as to receive a control command in a touch manner. Thereby, when touch is applied to the display device 141, the touch sensor may sense the touch, and the controller 170 may generate a control command corresponding to the touch. Contents input through touch may include characters, numbers, or menu items which can be indicated or specified in various modes.

Meanwhile, the display device 141 may include a cluster to allow the driver to check the vehicle condition information or vehicle driving information during driving. The cluster may be positioned on a dashboard. In this case, the driver may check the information displayed on the cluster while looking forward.

According to an embodiment, the display device 141 may be implemented as a head up display (HUD). Then, the display device 141 may output information through a transparent display included in a windshield. Alternatively, the display device 141 may include a projection module to output information through an image projected onto the windshield.

According to an embodiment, the display 141 may include a transparent display. In this case, the transparent display may be attached to the windshield.

The transparent display may display a predetermined screen with predetermined transparency. To implement transparency, the transparent display may include at least one of a transparent Thin Film Electroluminescent (TFEL), a transparent OLED, a transparent LCD, a transmissive transparent display, and a transparent LED display. Transparency of the transparent display is adjustable.

The sound output unit 142 converts an electrical signal from the controller 170 into an audio signal and outputs the audio signal. To this end, the sound output unit 142 may include a speaker. The sound output unit 142 may output sound corresponding to operation of the user input unit 124.

The haptic output unit 143 generates haptic output. For example, the haptic output unit 143 may vibrate the steering wheel, a seat belt, or a seat to allow the user to recognize the output.

The vehicle drive unit 150 may control operation of various vehicular devices. The vehicle drive unit 150 may include a power source drive unit 151, a steering drive unit 152, a brake drive unit 153, a lamp drive unit 154, an air conditioning drive unit 155, a window drive unit 156, a gear drive unit 157, a sunroof drive unit 158 and a suspension drive unit 159.

The power source drive unit 151 may perform electronic control of the power source in the vehicle 100.

For example, if a fossil fuel-based engine (not shown) is the power source, the power source drive unit 151 may perform electronic control of the engine. Thereby, the output torque of the engine may be controlled. If the power source drive unit 151 is an engine, the output torque of the engine may be controlled by the controller 170 to limit the speed of the vehicle.

As another example, if an electric motor (not shown) is the power source, the power source drive unit 151 may control the motor. Thereby, the rotational speed and torque of the motor may be controlled.

The steering drive unit 152 may perform electronic control of a steering apparatus in the vehicle 100. Thereby, the steering drive unit 152 may change the traveling direction of the vehicle.

The brake drive unit 153 may perform electronic control of a brake apparatus (not shown) in the vehicle 100. For example, the speed of the vehicle 100 may be reduced by controlling operation of the brakes disposed on wheels. As another example, the brake disposed on a left wheel may be operated differently from the brake disposed on a right wheel to adjust the traveling direction of the vehicle 100 to the left or right.

The lamp drive unit 154 may control lamps disposed inside and outside the vehicle to be turned on/off. In addition, the lamp drive unit 154 may control the intensity and direction of light from the lamps. For example, the lamp drive unit 154 may control a turn signal lamp and a brake lamp.

The air conditioning drive unit 155 may perform electronic control of an air conditioner (not shown) in the vehicle 100. For example, if the temperature of the interior of the vehicle 100 is high, the air conditioning drive unit 155 may control the air conditioner to supply cool air to the interior of the vehicle 100.

The window drive unit 156 may perform electronic control of a window apparatus in the vehicle 100. For example, the window drive unit 156 may control opening or closing of left and right windows on both sides of the vehicle 100.

The gear drive unit 157 may perform electronic control of a gear apparatus of the vehicle 100. For example, the gear drive unit 157 may control the gear apparatus of the vehicle 100 to be positioned at any one of Drive (D), Reverse (R), Neutral (N), and Park (P) gears of the vehicle 100 according to a signal of the controller 170.

The sunroof drive unit 158 may perform electronic control of a sunroof apparatus (not shown) in the vehicle 100. For example, the sunroof drive unit 158 may control opening or closing of the sunroof apparatus.

The suspension drive unit 159 may perform electronic control of a suspension apparatus (not shown) in the vehicle 100. For example, when a road surface is uneven, the suspension drive unit 159 may control the suspension apparatus to attenuate vibration of the vehicle 100.

According to an embodiment, the vehicle drive unit 150 may include a chassis drive unit. The chassis drive unit may include the steering drive unit 152, the brake drive unit 153 and the suspension drive unit 159.

The controller 170 may control overall operation of each unit in the vehicle 100. The controller 170 may be referred to as an Electronic Control Unit (ECU).

The controller 170 may be implemented as hardware using at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a microcontroller, a microprocessor, and an electrical unit for performing other functions.

The interface unit 180 may serve as a path to various types of external devices connected to the vehicle 100. For example, the interface unit 180 may include a port connectable to a mobile terminal. The interface unit 180 may be connected to the mobile terminal 310 through the port. In this case, the interface unit 180 may exchange data with the mobile terminal.

Meanwhile, the interface unit 180 may serve as a path for supplying electrical energy to a connected mobile terminal. If the mobile terminal is electrically connected to the interface unit 180, the interface unit 180 may supply electrical energy received from the power supply 190 to the mobile terminal under the control of the controller 170.

The power supply 190 may supply power necessary for operation of each constituent under the control of the controller 170. Particularly, the power supply 190 may receive power from a battery (not shown) in the vehicle 100.

If it is a first set time while the vehicle 100 travels, the vehicle driving assistance apparatus 200 may determine, based on traveling information of the vehicle 100, that video communication can be performed. If it is determined that the vehicle driving assistance apparatus 200 can perform video communication, the vehicle driving assistance apparatus 200 may perform video communication with a preset terminal. If video communication is performed, the display unit 280 may output an image and the alarm unit 290 may output sound. Through video communication, videoconferencing, video talk, and video lecture may be implemented.

Hereinafter, a description will be given focusing on the vehicle driving assistance apparatus 200.

Figure 3:
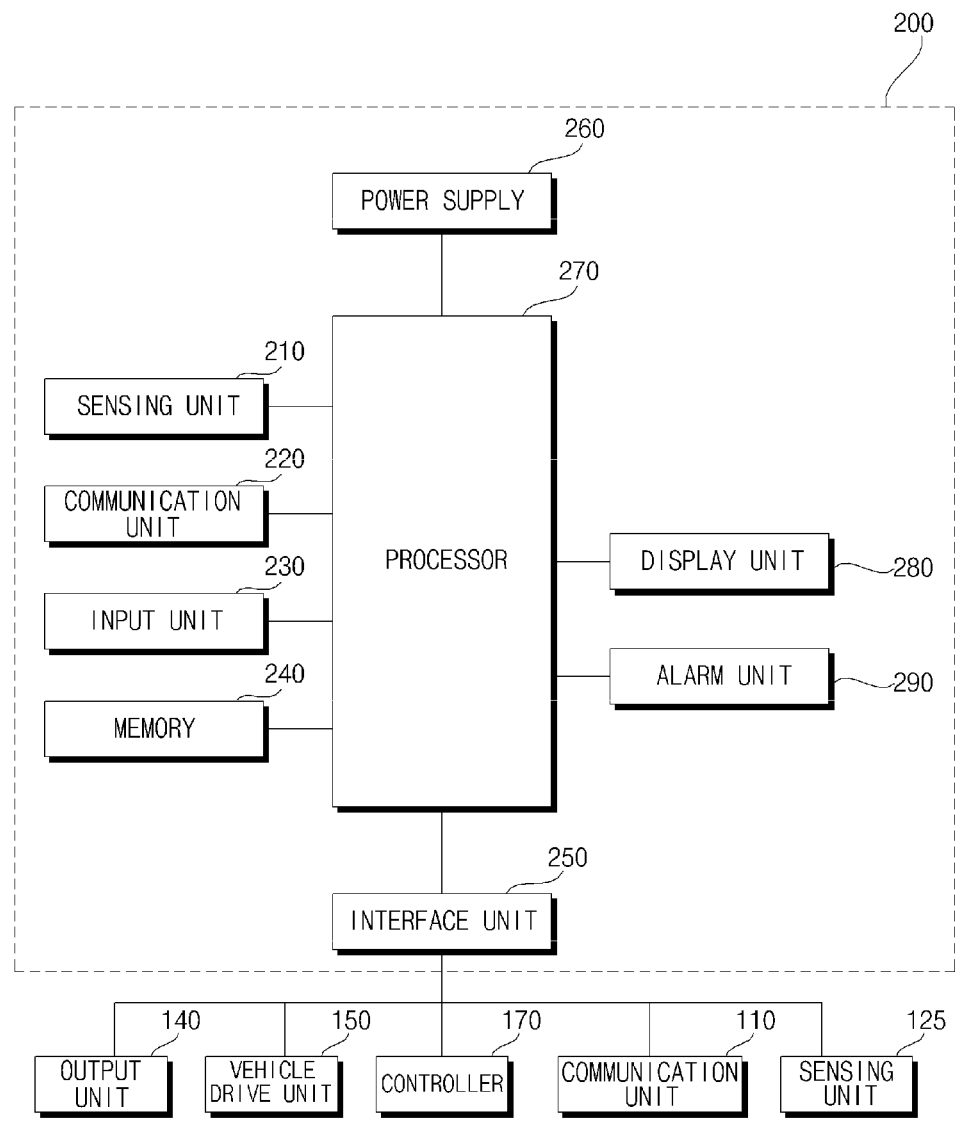
FIG. 3 is a block diagram of a vehicle driving assistance apparatus according to an embodiment of the present invention.

FIG. 3 is a block diagram of a vehicle driving assistance apparatus according to an embodiment of the present invention.

Referring to FIG. 3, the vehicle driving assistance apparatus 200 may include a sensing unit 210, a communication unit 220, an input unit 230, a memory 240, an interface unit 250, a power supply 260, a processor 270, a display unit 280, and an alarm unit 290.

The sensing unit 210 may include a means for sensing an object. The sensing unit 210 may sense an object located outside the vehicle 100. For example, the sensing unit 210 may sense an object which approaches from the rear of the vehicle 100. The sensing unit 210 may sense an object which approaches from a traveling lane or a lateral lane of the vehicle 100.

The sensing unit 210 may be electrically connected to the processor 270. Upon sensing an object, the sensing unit 210 may provide an object sensing signal to the processor 270. The processor 270 may determine whether the object sensed by the sensing unit 210 approaches from a traveling lane or a lateral lane of the vehicle 100, based on the object sensing signal provided by the sensing unit 210.

The sensing unit 210 may be disposed in one region of the vehicle 100. For example, the sensing unit 210 may be disposed on at least one of a side mirror, a front door, a rear door, a fender, and a rear bumper of the vehicle 100.

The sensing unit 210 may be plural in number. For example, at least one sensing unit 210 may be disposed at each of right and left sides of the vehicle 100.

The sensing unit 210 may include various types of devices capable of sensing an object. For example, the sensing unit 210 may include at least one of a camera, a radar, a lidar, an ultrasonic sensor, and an infrared sensor.

The camera may detect an object based on a captured image. The camera may include an image sensor and an image processor. According to an embodiment, the camera may be a stereoscopic camera.

The image processor may detect an object by processing an acquired image. The image processor may track the detected object.

The image processor may measure a distance to the object. For example, the image processor may measure the distance to the object using at least one of a pinhole, a movement vector, disparity, and variation of the object in size.

According to an embodiment, the camera may provide image data to the processor 270. Then, the processor 270 may perform image processing.

The ultrasonic sensor may include an ultrasonic transmitter and an ultrasonic receiver. The ultrasonic sensor may sense the object based on received ultrasonic waves which are obtained when transmitted ultrasonic waves are reflected from the object. The ultrasonic sensor may measure a distance between the sensed object and the vehicle 100. For example, if the sensing unit 210 is the ultrasonic sensor, the sensing unit 210 may provide data about the distance between the vehicle 100 and the sensed object to the processor 270.

The communication unit 220 may perform data communication with other devices located inside or outside the vehicle 100. The devices may include at least one of a terminal, a mobile terminal, a server, and another vehicle.

The communication unit 220 may communicate with other vehicles. The communication unit 220 may receive information about at least one of a type, location, speed, and traveling path of a vehicle from the vehicle. The communication unit 220 may be electrically connected to the processor 270. The communication unit 220 may provide information received by other devices to the processor 270.

The communication unit 220 may transmit various information to other devices. The processor 270 may transmit various information to other vehicles through the communication unit 220.

The processor 270 may inform a preceding vehicle that another vehicle approaches from behind the vehicle 100 or request that the preceding vehicle move forward by a predetermined distance or more, through the communication unit 220. For example, the processor 270 may transmit, through the communication unit 220, location information of a vehicle approaching from behind to the preceding vehicle. The processor 270 may transmit, through the communication unit 220, a message indicating that the preceding vehicle should move forward to the preceding vehicle.

The communication unit 220 may include at least one of a V2X communication module, an optical communication module, a location information module, and a short-range communication module.

The V2X communication module may perform wireless communication with a server or other vehicles. The V2X module may implement a V2V or V2I communication protocol. The communication unit 220 may receive information regarding other vehicles through the V2X communication module.

The optical communication module may include a light transmitter and a light receiver. The light receiver may receive information by converting a received light signal into an electrical signal. The light receiver may include a Photodiode (PD) for receiving light. The PD may convert light into an electrical signal. The light receiver may receive information regarding other vehicles through light emitted by the vehicles.

The light transmitter may convert an electrical signal into a light signal. The light transmitter may include at least one light emitting device. The light emitting device may be an LED. The light transmitter may externally emit the light signal through flickering of the light emitting device at a predetermined frequency. The light transmitter may include an array of a plurality of light emitting devices. The light transmitter may be incorporated into a lamp included in the vehicle 100. The light transmitter may include at least one of a headlight, a taillight, a brake lamp, a turn signal lamp, and a sidelight.

The location information module may acquire information about the location of the vehicle 100. The location information module may be a GPS module. The GPS module may acquire the location of the vehicle 100 based on a signal transmitted by a GPS satellite.

The short-range communication module may perform short-range communication. The short-range communication module forms a wireless local area network. The short-range communication module may perform short-range communication with at least one device through the wireless local area network. The short-range communication module may exchange data with a mobile terminal. The short-range communication module may receive weather information and traffic state information (e.g., TPEG) from the mobile terminal. The short-range communication module may be paired with the mobile terminal automatically or by execution of an application by a user.

The short-range communication module may use at least one of Bluetooth™, RFID, IrDA, UWB, ZigBee, NFC, Wi-Fi, Wi-Fi Direct, and wireless USB.

The input unit 230 may receive input for the vehicle driving assistance apparatus 200. The input unit 230 may receive user input for the vehicle driving assistance apparatus 200. When ON input for the vehicle driving assistance apparatus 200 is received through the input unit 230, the vehicle driving assistance apparatus 200 may be operated.

The input unit 230 may be electrically connected to the processor 270. The input unit 230 may generate a signal corresponding to received input and provide the signal to the processor 270. The processor 270 may control the vehicle driving assistance apparatus 200 according to input for the vehicle driving assistance apparatus 200 received through the input unit 230.

The input unit 230 may receive activation input for various functions of the vehicle driving assistance apparatus 200. For example, the input unit 230 may receive setting input for setting an alarm output method of the alarm unit 290.

The input unit 230 may include at least one of a mechanical input device, a touch type input device, and a wireless input device.

The mechanical input device may include a button, a lever, a jog wheel, and a switch. The touch type input device may include at least one touch sensor. The touch input device may be configured as a touchscreen. In this case, the touch input device may form the touchscreen by being layered with the display unit 280. The wireless input device may wirelessly receive user input.

The input unit d230 may include a camera (not shown) and a microphone (not shown). The camera may generate image data by capturing an image. The microphone may generate input sound as sound data which is an electrical signal. The input unit 230 may provide at least one of the generated image data and sound data to the processor 270. The processor 270 may convert the image data and the sound data received through the input unit 230 into user input for the vehicle driving assistance apparatus 200. For example, the processor 270 may perform a specific function of the vehicle driving assistance apparatus 200 in correspondence to voice input through the microphone.

The memory 240 may store various types of data about operation of the vehicle driving assistance apparatus 200, such as a program for processing or controlling the processor 270. The memory 240 may be electrically connected to the processor 270. The processor 270 may cause the memory 240 to store various types of data about operation of the vehicle driving assistance apparatus 200.

The memory 240 may be one of various hardware devices such as a ROM, a RAM, an EPROM, a flash drive, and a hard drive. According to an embodiment, the memory 240 may be a constituent of the processor 270.

The interface unit 250 may serve as a path between the vehicle driving assistance apparatus 200 and an external device. The interface 250 may externally receive various signals or information or externally transmit various signals or information provided by the processor 270. The interface unit 250 may be connected to the processor 270, the output unit 140, the vehicle drive unit 150, the controller 170, the communication unit 110, and the sensing unit 125 to perform data communication.

The interface unit 250 may transmit a signal provided by the processor 270 to the controller 170 or the vehicle drive unit 150.

For example, the processor 270 may provide a signal for controlling at least one of a driving apparatus, a steering apparatus, and a brake apparatus of the vehicle 100 so that the vehicle 100 may move to a lateral lane. If the interface unit 250 provides the signal to the controller 170, the controller 170 may control the vehicle 100 to move to a lateral lane.

The interface unit 250 may provide received from the controller 170, the communication unit 110, and the sensing unit 125 to the processor 270.

The surrounding situation information may include at least one of vehicle location information (GPS information), gear state information, speed information, handle steering angle information, and turn signal lamp information, vehicle direction information, vehicle angle information, acceleration information, tilt information, forward/back information, battery information, fuel information, tire information, lamp information, vehicle inner temperature information, vehicle inner humidity information, and information as to whether it is raining.

The surrounding situation information may be acquired by a position module for providing the vehicle location information, a gear position sensor, a speed sensor, a handle steering angle sensor, a turn signal lamp sensor, a heading sensor, a yaw sensor, a gyro sensor, a vehicle forward/back sensor, a wheel sensor, a vehicle body tilt sensor, a battery sensor, a fuel sensor, a tire sensor, a steering sensor based on turning of a steering wheel, a vehicle inner temperature sensor, a vehicle inner humidity sensor, and a rain sensor. The position module may include a GPS module for receiving GPS information.

The surrounding situation information may include information about a traveling route of the vehicle 100. The interface unit 250 may receive the information about the traveling route of the vehicle 100 through data communication with the controller 170 or an additional navigation device. The information about the traveling route of the vehicle 100 may include at least one of traveling road information indicating a type of a road on which the vehicle 100 travels, traffic situation information indicating a traffic situation of the traveling route, preset designation information, route information based on a designation, map information related to the traveling route, and current location information of the vehicle 100. The interface unit 250 may provide the information about the traveling route of the vehicle 100 to the processor 270.

The power supply unit 260 may supply a power source necessary for operation of each element under control of the processor 270. The power supply unit 260 may receive the power source from a battery in the vehicle 100.

The display unit 280 may display various graphical objects. For example, the display unit 280 may display an LPB or an LPS for preventing the vehicle 100 from colliding with a preceding object while traveling.

The LPB may be a point which is nearest a preceding object among points at which the vehicle 100 may not collide with the preceding object as the vehicle 100 brakes while traveling. For example, a point separated by a minimum brake distance from the preceding object may be the LPB.

The LPS may be a point which is nearest a preceding object among points at which the vehicle 100 may not collide with the preceding object as the vehicle 100 steers while traveling.

The display unit 280 may display a screen requesting that a user perform braking input or steering change input. For example, the display unit 280 may display an alarm screen indicating that a user should brake. The display unit 280 may display an alarm screen indicating that a user should turn a steering wheel.

The display unit 280 may include at least one of an LCD, a TFT LCD, an OLED, a flexible display, a 3D display, and an e-ink display.

The display unit 280 may implement a touchscreen by forming a layered structure together with a touch sensor or being incorporated into the touch sensor. The touchscreen may serve as the input unit 230 which provides an input interface between the vehicle 100 and the user and also as an output interface between the vehicle 100 and the user. In this case, the display unit 280 may include a touch sensor for sensing touch applied to the display unit 280 so as to receive a control command in a touch manner. As such, when touch is applied to the display unit 280, the touch sensor senses the touch and the controller 170 may generate a control command corresponding to the touch. Touch input may include characters, numbers, or menu items which can be indicated or specified in various modes.

Meanwhile, the display unit 280 may include a cluster to allow the driver to check vehicle condition information or vehicle driving information while the driver drives. The cluster may be positioned on a dashboard. In this case, the driver may check information displayed on the cluster while keeping eyes on the front of the vehicle 100.

According to an embodiment, the display unit 280 may be implemented as an HUD. Then, the display unit 280 may output information through a transparent display included in a windshield. Alternatively, the display unit 280 may include a projection module to output information through an image projected onto the windshield.

According to an embodiment, the display unit 280 may include a transparent display. In this case, the transparent display may be attached to the windshield.

The transparent display may display a predetermined screen with predetermined transparency. To implement transparency, the transparent display may include at least one of a transparent TFEL, a transparent OLED, a transparent LCD, a transmissive transparent display, and a transparent LED. Transparency of the transparent display is adjustable.

The alarm unit 290 may output at least one of sound or vibration based on an electrical signal provided by the processor 270. To this end, the alarm unit 290 may include a speaker and a vibration device.

For example, the alarm unit 290 may request that a user perform braking input or steering change input by outputting at least one of sound or vibration within a set time from a time at which the vehicle 100 reaches an LPS or an LPB.

The alarm unit 290 may be operated to vibrate a steering wheel, a seat belt, or a seat to allow the user to recognize vibration.

The processor 270 may control overall operation of each unit in the vehicle driving assistance apparatus 200. The processor 270 may be electrically connected to the sensing unit 210, the communication unit 220, the input unit 230, the memory 240, the interface unit 250, the power supply unit 260, the display unit 280, and the alarm unit 290.

The processor 270 may determine whether an object sensed by the sensing unit 210 approaches from a traveling lane or a lateral lane, based on an object sensing signal provided by the sensing unit 210. Hereinafter, a traveling lane refers to a lane in which the vehicle 100 travels and a lateral lane refers to a lane next to the traveling lane.

The processor 270 may determine whether an object approaches from behind the vehicle 100 based on the object sensing signal. In addition, the processor 270 may determine whether an object sensed by the sensing unit 210 approaches from the traveling lane or the lateral lane of the vehicle 100.

If it is determined that the object sensed by the sensing unit 210 approaches from the traveling lane or the lateral lane of the vehicle 100, the processor 270 may determine that there is possibility of collision between the vehicle 100 and the object, based on acquired surrounding situation information. In some implementations, the processor 270 can calculate a probability of collision between the vehicle 100 and the object based on the surrounding situation information. For example, the processor 270 calculates a probability of collision between the vehicle 100 and the object as 50% based on the surrounding situation information. Based on the probability of collision, if the probability of collision is over a particular threshold, e.g., 50%, the processor 270 can determine that there is possibility of collision between the vehicle 100 and the object.

The surrounding situation information may include information about an object sensed by the sensing unit 210. The processor 270 may generate the surrounding situation information based on the object sensing signal provided by the sensing unit 210.

For example, the surrounding situation information may include information about speed of a vehicle sensed by the sensing unit 210, type of the vehicle, and distance between the vehicle and the vehicle 100. The surrounding situation information may include information about size, type, and location of a pedestrian, a centerline, a lane, and other objects.

The surrounding situation information may include information externally received by the communication unit 220. For example, the surrounding situation information may include location information, speed, type, and a sensing value of a vehicle transmitted by the vehicle through V2V communication. The surrounding situation information may include information received through communication with road infrastructure.

The surrounding situation information may include navigation information. For example, surrounding situation information may include type of a road on which the vehicle 100 is located, a traffic situation around the vehicle 100, and location information of the vehicle 100.

The surrounding situation information may include information regarding the vehicle 100, received by the interface unit 250. For example, the surrounding situation information may include information about speed, location, weight, braking distance, various input states, and steering angle of the vehicle 100.

The processor 270 may determine, based on the surrounding situation information, what is approaching the vehicle 100. The processor 270 may determine a type and speed of another vehicle approaching the vehicle 100 and distance between the approaching vehicle and the vehicle 100, based on the surrounding situation information. The processor 270 may determine, based on the surrounding situation information, where a traveling lane of the vehicle 100, which type of an object is placed around the vehicle 100, where the vehicle 100 is located, and to which space the vehicle 100 can move.

The processor 270 may determine, based on the surrounding situation information, whether collision between the vehicle 100 and an object sensed by the sensing unit 210 can be avoided.

If it is determined that collision between the vehicle 100 and the object can be avoided, the processor 270 may determine movement of the vehicle 100 to avoid collision with the object, based on the surrounding situation information.

If it is determined that collision between the vehicle 100 and the object cannot be avoided, the processor 270 may determine movement of the vehicle 100 to reduce or minimize collision occurring during collision with the object, based on the surrounding situation information.

The processor 270 may provide a signal for controlling at least one of a driving apparatus, a steering apparatus, and a brake apparatus of the vehicle 100 to control movement of the vehicle 100. Hereinafter, a signal for controlling at least one of the driving apparatus, the steering apparatus, and the brake apparatus of the vehicle 100 will be referred to as the signal or a vehicle control signal.

For example, the processor 270 may provide the vehicle control signal so as to prevent collision between the vehicle 100 and the object or reduce or minimize impulse exerted on the vehicle 100 during collision.

If the processor 270 provides the vehicle control signal, the vehicle 100 may move so as to prevent collision with the sensed object or reduce or minimize impulse exerted on the vehicle 100 during collision. For example, if the processor 270 provides the vehicle control signal, the vehicle 100 may avoid another vehicle approaching from behind during traveling or stopping.

The vehicle control signal provided by processor 270 may be transmitted to the controller 170 or the vehicle drive unit 150 through the interface unit 250. The controller 170 may control the vehicle 100 to move according to movement determined by the processor 270 in correspondence to the vehicle control signal. The vehicle drive unit 150 may be driven in correspondence to the vehicle control signal.

If the vehicle stops while traveling, the processor 270 may provide the vehicle control signal to prevent collision between the vehicle 100 and the object sensed by the sensing unit 210 or reduce or minimize impulse during collision.

This serves to prevent subsequent collision which may additionally occur when the vehicle 100 stops during traveling.

The case in which the vehicle 100 stops during traveling may include the case in which an AEB system of the vehicle 100 is operated, braking input by a user occurs, or the vehicle 100 collides with a preceding vehicle.

If an AEB of the vehicle 100 is operated, braking input by a user occurs, or the vehicle 100 collides with a preceding vehicle while the vehicle 100 travels so that the vehicle 100 stops, the processor 270 may provide the vehicle control so that the vehicle 100 may not collide with an object approaching from a traveling lane or a lateral lane, based on the surrounding situation information.

The processor 270 may determine, based on the surrounding situation information, whether a vehicle having possibility of collision with the vehicle 100 approaches from a traveling lane of the vehicle 100. For example, the possibility of collision can be determined based on a probability of collision as described above.

If it is determined, based on the surrounding situation information, that another vehicle having possibility of collision with the vehicle 100 approaches from the traveling lane of the vehicle 100, the processor 270 may provide the vehicle control signal so that the vehicle 100 may move to the lateral lane.

If another vehicle approaches from the traveling lane of the vehicle 100, the processor 270 may move to the lateral lane of the vehicle 100 so that collision between the vehicle 100 and the other vehicle may not occur.

The processor 270 may determine whether a vehicle having possibility of collision with the vehicle 100 is present in the lateral lane of the vehicle 100. If it is determined, based on the surrounding situation information, that another vehicle having possibility of collision approaches from the traveling lane of the vehicle 100 and there is no vehicle having possibility of collision with the vehicle 100 in the lateral lane, the processor 270 may provide the vehicle control signal so that the vehicle 100 may move to the lateral lane.

If a vehicle approaches even from the lateral lane to which the vehicle 100 is to move, since there is possibility of collision between the vehicle and the vehicle 100, the vehicle 100 may move to the lateral lane only after the processor 270 confirms that there is no vehicle approaching from the lateral lane to which the vehicle 100 is to move.

If it is determined, based on the surrounding situation information, that there is a vehicle having possibility of collision in the traveling lane, there is no vehicle having possibility of collision in the lateral lane, and a distance between the vehicle 100 and a preceding object is equal to or greater than a set distance, the processor 270 may provide the vehicle control signal so that the vehicle 100 moves to the lateral lane.

The set distance may be a minimum distance between the vehicle 100 and the preceding object, necessary when the vehicle 100 moves to the lateral lane. The set distance may be determined by experimentation and may be a value stored in the memory 240. In order for the vehicle 100 to move to the lateral lane, a predetermined distance should be secured on the front side of the vehicle 100. Therefore, the processor 270 may move the vehicle 100 to the lateral lane after confirming that the set distance is secured.

If the vehicle 100 moves to the lateral lane, the processor 270 may provide the vehicle control signal so that the vehicle 100 does not cross a centerline or two or more lateral lanes.

If the vehicle 100 crosses a centerline or two or more lateral lanes, since there is a high possibility of collision, the processor 270 may cause the vehicle 100 not to cross the centerline or two or more lateral lines and to cross only one lane.

Upon determining that the preceding object is a preceding vehicle and it is determined, based on the surrounding situation information, that a distance between the vehicle 100 and the preceding vehicle is less than the set distance or another vehicle having possibility of collision with the vehicle 100 approaches from a lateral lane, the processor 270 may inform the preceding vehicle that there is a vehicle approaching from a traveling lane of the vehicle 100 or request that the preceding vehicle move forward by a predetermined distance or more, through the communication unit 220.

The processor 270 may determine, based on the surrounding situation information, whether an object present in front of the vehicle 100 is a vehicle. A vehicle present in front of the vehicle 100 is defined as a preceding vehicle.

If the distance between the vehicle 100 and the preceding vehicle is less than the set distance, the vehicle 100 cannot move to the lateral lane. In addition, even when another vehicle having possibility of collision with the vehicle 100 approaches from the lateral lane to which the vehicle 100 is to move, the vehicle 100 cannot move to the lateral lane. The processor 270 may determine when the vehicle 100 cannot move to the lateral lane, based on the surrounding situation information.

If it is determined that the vehicle 100 cannot move to the lateral lane, the processor 270 may request that the preceding vehicle move, through the communication unit 220. The processor 270 may inform the preceding vehicle that there is a vehicle approaching from the traveling lane of the vehicle 100 or request that the preceding vehicle move forward by a predetermined distance or more. For example, the processor 270 may transmit a message to the preceding vehicle.

If it is determined that the vehicle 100 cannot move to the lateral lane, the processor 270 may request that the preceding vehicle move by sounding a horn of the vehicle 100.

If it is determined, based on the surrounding situation information, that a vehicle having possibility of collision with the vehicle 100 approaches from the lateral lane while the vehicle 100 stops, the processor 270 may provide a signal for locking a steering apparatus of the vehicle 100.

When the vehicle 100 stops, a driver may involuntarily turn a steering wheel, which is the steering apparatus. In this case, if a vehicle having possibility of collision with the vehicle 100 approaches from a lateral lane toward which the steering wheel turns, collision may occur. To prevent such a situation, the processor 270 may provide the signal to lock the steering apparatus of the vehicle 100 upon determining that a vehicle having possibility of collision with the vehicle 100 approaches from the lateral lane while the vehicle 100 stops.

If it is determined, based on the surrounding situation information, that a vehicle approaching from the traveling lane of the vehicle 100 and a vehicle approaching from the lateral lane have possibility of collision with the vehicle 100, the processor 270 may provide the vehicle control signal so that the vehicle 100 moves to a lane from which a vehicle having a smaller impulse during collision with the vehicle 100 out of the vehicles approaches.

If a vehicle approaches from the traveling lane of the vehicle 100 and a vehicle approaches even from the lateral lane, the processor 270 may determine, based on the surrounding situation information, whether there is possibility of collision between the vehicles and the vehicle 100.

If the vehicle 100 is located in the traveling lane, the processor 270 may determine, based on the surrounding situation information, the possibility of collision with a vehicle approaching from the traveling lane and impulse exerted on the vehicle 100 during collision. If the vehicle 100 moves to the lateral lane, the processor 270 may determine, based on the surrounding situation information, whether the vehicle 100 has possibility of collision with a vehicle approaching from the lateral lane and how much impulse occurs during collision.

If it is determined that the vehicles have possibility of collision with the vehicle 100, the processor 270 may compare impulse exerted on the vehicle 100 during collision. The processor 270 may provide the vehicle control signal so that the vehicle 100 moves to a lane from which a vehicle having a smaller impulse during collision with the vehicle 100 approaches.

For example, if a heavy truck having possibility of collision with the vehicle 100 approaches from the traveling lane and a general vehicle having possibility of collision with the vehicle 100 approaches from the lateral lane, since a smaller impulse occurs when the vehicle 100 collides with the general vehicle than the heavy truck, the processor 270 may provide the vehicle control signal so that the vehicle 100 may move to the lateral lane. Therefore, the vehicle 100 collides with the general vehicle having a relatively smaller impulse, thereby reducing injury to a driver.

If it is determined, based on the surrounding situation information, that the vehicle 100 invades the lateral lane during stopping, the vehicle 100 may provide the vehicle control signal so that the vehicle 100 moves to the traveling lane.

If the vehicle 100 stops due to collision with another vehicle, the vehicle 100 may invade the lateral lane while stopping. In addition, if the vehicle 100 suddenly stops, the vehicle 100 may invade the lateral lane as the driver abruptly manipulates the steering wheel.

The processor 270 may determine based on the surrounding situation information whether the vehicle 100 invades the lateral lane while stopping. The processor 270 may determine based on the surrounding situation information whether the vehicle 100 invades the lateral lane by determining which lane the vehicle 100 originally traveled in and in which lane the vehicle 100 is currently located.

Upon determining that the vehicle 100 invades the lateral lane while stopping, the processor 270 may cause the vehicle 100 to move to the traveling lane to prevent collision with another vehicle approaching from the lateral lane.

If it is determined, based on the surrounding situation information, that a vehicle having possibility of collision with the vehicle 100 approaches from the lateral lane that the vehicle 100 has invaded during stopping, the processor 270 may provide the vehicle control signal so that the vehicle 100 may move to the traveling lane.

If it is determined that the vehicle 100 invades the lateral lane while stopping, the processor 270 may determine, based on the surrounding situation information, whether another vehicle having possibility of collision with the vehicle 100 approaches from the lateral lane that the vehicle 100 has invaded.

If it is determined that a vehicle having possibility of collision with the vehicle 100 approaches from the lateral lane that the vehicle 100 has invaded, the processor 270 may provide the vehicle control signal to prevent collision between the vehicle 100 and the other vehicle. Thus, the processor 270 may cause the vehicle 100 to move to the traveling lane.

If it is determined, based on the surrounding situation information, that a vehicle having possibility of collision with the vehicle 100 approaches from the lateral lane that the vehicle 100 has invaded and a distance between the vehicle 100 and a preceding vehicle is equal to or greater than a set distance, the processor 270 may provide the vehicle control signal so that the vehicle 100 may move to the traveling lane.

Upon determining that the vehicle 100 has invaded the lateral lane while stopping, the processor 270 may determine, based on the surrounding situation information, a distance between the vehicle 100 and the preceding vehicle. The processor 270 may determine whether the distance between the vehicle 100 and the preceding vehicle is equal to or greater than the set distance.

The set distance may be a minimum distance necessary until the vehicle 100 that has invaded the lateral lane returns to an original traveling lane. The set distance is a value which is determined by experimentation and is stored in a memory.

If another vehicle having possibility of collision with the vehicle 100 approaches from the lateral lane that the vehicle 100 has invaded, the processor 270 may determine whether the set distance between the vehicle 100 and the preceding vehicle is equal to or greater than the set distance to determine whether the vehicle 100 may return to the original traveling lane while not colliding with the preceding vehicle.

Upon determining that the vehicle 100 can return to the original traveling lane, the processor 270 may provide the vehicle control signal so that the vehicle 100 may move to the traveling lane. The vehicle 100 may move to the traveling lane in correspondence to the vehicle control signal. Then, the vehicle 100 can avoid collision with another vehicle approaching from the lateral lane.

If it is determined, based on the surrounding situation information, that a vehicle having possibility of collision with the vehicle 100 approaches from the lateral lane that the vehicle 100 has invaded, the set distance to the preceding vehicle is equal to or greater than the set distance, and there is no vehicle having possibility of collision with the vehicle 100 in the traveling lane, the processor 270 may provide the vehicle control signal so that the vehicle 100°| may move to the traveling lane.

If a vehicle having possibility of collision with the vehicle 100 approaches from the lateral lane that the vehicle 100 has invaded, the processor 270 may determine whether there is another vehicle approaching from the traveling lane to which the vehicle 100 is to move. If there is a vehicle approaching from the traveling lane, since the vehicle 100 may collide with the vehicle approaching to the traveling lane even when the vehicle 100 moves to the traveling lane, the processor 270 may confirm whether there is a vehicle approaching from the traveling lane to which the vehicle 100 is to move.

Upon determining that there is no vehicle having possibility of collision with the vehicle 100 in the traveling lane, the processor 270 may provide the vehicle control signal so that the vehicle 100 may move to the traveling lane.

Unlike this, if it is determined that a vehicle approaches from the lateral lane that the vehicle 100 has invaded and a vehicle approaches even from the traveling lane, the processor 270 may determine, based on the surrounding situation information, which vehicle has a smaller impulse during collision. The processor 270 may cause the vehicle 100 to move to a lane in which a vehicle having a smaller impulse during collision is present.

If it is determined, based on the surrounding situation information, that a vehicle having possibility of collision with the vehicle 100 approaches from the lateral lane that the vehicle 100 has invaded and the distance between the vehicle 100 and a preceding vehicle is less than the set distance, the processor 270 may inform the preceding vehicle that another vehicle approaches or request that the preceding vehicle move forward by a predetermined distance or more, through the communication unit 220.

If a vehicle having possibility of collision with the vehicle 100 approaches from the lateral lane that the vehicle 100 has invaded, the processor 270 may determine whether the distance between the vehicle 100 and the preceding vehicle is equal to or greater than the set distance to determine whether the vehicle 100 can return to the original traveling lane while not colliding with the preceding vehicle.

If it is determined that the distance between the vehicle 100 and the preceding vehicle is less than the set distance, the processor 270 may determine that the vehicle 100 cannot return to an original traveling lane while not colliding with the preceding vehicle.

If it is determined that the vehicle 100 cannot return to the original traveling lane, the processor 270 may inform the preceding vehicle that another vehicle approaches or request that the preceding vehicle move forward by a predetermined distance or more, through the communication unit 220. For example, the processor 270 may transmit a message to the preceding vehicle.

If it is determined that the vehicle 100 cannot move to the lateral lane, the processor 270 may request that the preceding vehicle move by sounding a horn of the vehicle 100.

If it is determined, based on the surrounding situation information, that there is no vehicle approaching from the lateral lane that the vehicle 100 has invaded and a vehicle having possibility of collision with the vehicle 100 approaches from the traveling lane, the processor 270 may provide the vehicle control signal so that the vehicle 100 may move to the lateral lane.

The processor 270 may determine, based on the surrounding situation information, whether a vehicle approaches from the lateral lane that the vehicle 100 has invaded and whether a vehicle approaches from the traveling lane.

If a vehicle having possibility of collision with the vehicle 100 is present in the traveling lane but not in the lateral lane, since the vehicle 100 should move to the lateral lane to avoid collision with the vehicle, the processor 270 may provide the vehicle control signal so that the vehicle 100 may move to the lateral lane.

The vehicle 100 may fully move to the lateral lane, thereby avoiding collision with another vehicle approaching from the traveling lane.

If there is a preceding object while the vehicle 100 travels, the processor 270 may calculate, based on the surrounding situation information, at least one of an LPB and an LPS for preventing the vehicle 100 from colliding with the preceding object.

The LPB may be a point nearest the preceding object among points at which the vehicle 100 starts to brake in order not to collide with the preceding object while traveling. For example, the LPB may be a point separated from the preceding object by a minimum braking distance of the vehicle 100. Upon receiving maximum braking input at the LPB while traveling, the vehicle 100 may stop without collision with the preceding object.

The LPB may differ according to speed of the vehicle 100, braking capability, weight of the vehicle 100, a tire state, and a road surface state. Since information about speed of the vehicle 100, braking capability, weight of the vehicle 100, a tire state, and a road state is included in the surrounding situation information, the processor 270 may calculate the LPB based on the above information.

The LPS may be a point nearest the preceding object among points at which the vehicle 100 starts to steer in order to avoid collision with the preceding object while traveling. For example, the vehicle 100 may not collide with the preceding object when the steering wheel of the vehicle 100 turns at the LPS while traveling.

The LPS may differ according to a relative location between the vehicle 100 and the preceding object, speed of the vehicle 100, steering change speed, weight of the vehicle 100, a tire state, and a road surface state. For example, if the preceding object is located slightly to the left based on the traveling direction of the vehicle 100, the vehicle 100 may avoid the preceding object by steering slightly to the right. In this case, the LPS may be relatively near the preceding object.

The processor 270 may display at least one of the LPB and the LPS on the display unit 280.

The display unit 280 may include at least one of a cluster, an HUD, and a center information display (CID) included in the vehicle 100. The processor 270 may display at least one of the LPB and the LPS on at least one of the cluster, the HUD, and the CID.

Since the LPB and the LPS may be changed in real time according to a relative location between the vehicle 100 and the preceding object, speed of the vehicle 100, braking capability, weight of the vehicle 100, a tire state, and a road surface state, the processor 270 may display at least one of the LPB and the LPS changed in real time on the display unit 280.

The processor 270 may request that a user perform braking input, through at least one of the display unit 280 and the alarm unit 290, before a set time starting from a time at which the vehicle 100 reaches the LPB.

The processor 270 may determine the time at which the vehicle 100 reaches the LPB, based on surrounding situation information.

The processor 270 may determine whether it is a time within the set time starting from the time at which the vehicle 100 reaches the LPB. For example, if the set time is 3 seconds, the processor 270 may determine whether a current time is within 3 seconds before the vehicle 100 reaches the LPB.

The set time is a time which is set such that a driver may cope with braking before the vehicle 100 reaches the LPB. If the vehicle 100 does not brake at a moment when the vehicle 100 reaches the LPB, since collision between the vehicle 100 and a preceding object may occur, the driver needs to operate a braking apparatus before the vehicle 100 reaches the LPB. The set time may be determined by experimentation and may be a value stored in the memory 240.

The processor 270 may request that a user perform braking input within the set time starting from a time at which the vehicle 100 reaches the LPB. The processor 270 may request, through at least one of the display unit 280 and the alarm unit 290, that the user perform braking input. For example, if the set time is 3 seconds, the processor 270 may display a message requesting that the user perform braking input on the display unit 280 and simultaneously may generate sound and vibration through the alarm unit 290, within 3 seconds before the vehicle 100 reaches the LPB.

The processor 270 may request that the user perform steering change input, through at least one of the display unit 280 and the alarm unit 290, within the set time starting from a time at which the vehicle 100 reaches the LPS.

The processor 270 may determine the time at which the vehicle 100 reaches the LPS based on the surrounding situation information.

The processor 270 may determine whether it is a time within the set time starting from the time at which the vehicle 100 reaches the LPS. For example, if the set time is 2 seconds, the processor 270 may determine whether a current time is within 2 seconds until the vehicle 100 reaches the LPS.

The set time is a time which is set such that a driver may cope with steering before the vehicle 100 reaches the LPS. If steering is not changed at a moment when the vehicle 100 reaches the LPS, since collision between the vehicle 100 and a preceding object may occur, the driver needs to operate the steering apparatus before the vehicle 100 reaches the LPS. The set time may be determined by experimentation and may be a value stored in the memory 240.

The processor 270 may request that a user perform steering change input within the set time starting from a time at which the vehicle 100 reaches the LPS. The processor 270 may request that the user perform steering change input through at least one of the display unit 280 and the alarm unit 290. For example, if the set time is 2 seconds, the processor 270 may display a message requesting that the user turn the steering wheel on the display unit 280 and simultaneously may generate sound and vibration through the alarm unit 290, within 2 seconds before the vehicle 100 reaches the LPS.

If the speed of the vehicle 100 is equal to or greater than a set speed, the processor 270 may display the LPB on the display unit 280 and, if the speed of the vehicle 100 is less than the set speed, the processor 270 may display the LPS on the display unit 280.

If the speed of the vehicle 100 is equal to or greater than a specific speed, the vehicle 100 first reaches the LPB rather than the LPS. If the speed of the vehicle 100 is less than the specific speed, the vehicle 100 first reaches the LPS rather than the LPB. The specific speed may be determined by experimentation. The set speed may be the specific speed and may be a value stored in the memory 240.

If the speed of the vehicle 100 is equal to or greater than the set speed, since the vehicle 100 first reaches the LPB, the processor 270 may display the LPB on the display unit 280. The processor 270 may determine whether the speed of the vehicle 100 is equal to or greater than the set speed, based on the surrounding situation information.

If the speed of the vehicle 100 is less than the set speed, since the vehicle 100 first reaches the LPS, the processor 270 may display the LPS on the display unit 280.

If there is a vehicle having possibility of collision with the vehicle 100 in the lateral lane, the processor 270 may display only the LPB on the display unit 280.

The processor 270 may determine, based on the surrounding situation information, whether there is a vehicle having possibility of collision with the vehicle 100 in the lateral lane.

If steering of the vehicle 100 is changed in a situation in which a vehicle having possibility of collision with the vehicle 100 is present in the lateral lane, since the vehicle 100 may collide with the other vehicle, the processor 270 may display only the LPB on the display unit 280 upon determining that there is a vehicle having possibility of collision with the vehicle 100 in the lateral lane.

If the vehicle 100 reaches the LPB, the processor 270 may provide the vehicle control signal so that the vehicle 100 may brake. When the vehicle 100 reaches the LPS, the processor 270 may provide the vehicle control signal so that the vehicle 100 may move to the lateral lane.

The processor 270 may determine, based on the surrounding situation information, whether the vehicle reaches the LPB or the LPS.

If the vehicle 100 reaches the LPB, the vehicle 100 should brake in order for the vehicle 100 not to collide with a preceding object. If it is determined that the vehicle 100 reaches the LPB, the processor 270 may cause the vehicle 100 to brake by providing a signal for controlling the braking apparatus of the vehicle 100.

If the vehicle 100 reaches the LPS, steering of the vehicle 100 should be changed in order for the vehicle 100 not to collide with the preceding object. If it is determined that the vehicle 100 reaches the LPS, the processor 270 may cause the vehicle 100 to move to the lateral lane by providing a signal for controlling at least one of the steering apparatus, the braking apparatus, and the driving apparatus of the vehicle 100.

The processor 270 may provide the signal for controlling at least one of the steering apparatus, the brake apparatus, and the driving apparatus of the vehicle 100 to maintain a distance between the vehicle 100 and a preceding object of the vehicle 100 at a preset first safe distance while the vehicle 100 travels.

The vehicle 100 may travel while maintaining the distance to the preceding object at the first safe distance in correspondence with the signal.

The first safe distance is a set distance value in order to prevent collision between the vehicle 100 and the preceding object and may be determined by experimentation. The first safe distance may be a value stored in the memory 240.

If it is determined, based on the surrounding situation information, that a rear object approaching from the traveling lane approaches within a rear safe distance to the vehicle 100, the distance between the vehicle 100 and the preceding object may be adjusted to a second safe distance which is less than the first safe distance.

The vehicle 100 may travel while maintaining the distance to the preceding object at the changed second safe distance in correspondence to the signal.

The rear safe distance is a value which is set in order to prevent the vehicle 100 from colliding with the rear object and may be a value determined by experimentation. The rear safe distance may be a value stored in the memory 240.

The processor 270 may determine based on the surrounding situation information whether the rear object approaching from behind vehicle 100 approaches within the rear safe distance.

Upon determining that the rear object approaches within the rear safe distance from the vehicle 100, the processor 270 may adjust a distance between the vehicle 100 and the preceding object to the second safe distance. Next, the processor 270 may control the vehicle 100 to maintain the distance between the vehicle 100 and the preceding object at the second safe distance.

The second safe distance may be less than the first safe distance. The second safe distance may be a value stored in the memory 240.

As the distance between the vehicle 100 and the preceding object is reduced to the second safe distance from the first safe distance, the distance between the vehicle 100 and the rear object may increase by the rear safe distance or more.

If the rear object approaches within the rear safe distance from the back of the vehicle 100, since the vehicle 100 may collide with the rear object, the processor 270 may reduce the distance between the vehicle 100 and the preceding object, thereby preventing collision between the vehicle 100 and the rear object.

The processor 270 may be implemented using at least one of an ASIC, a DSPD, a PLD, an FPGA, a processor, a controller, a microcontroller, a microprocessor, and an electrical unit performing other functions.

FIGS. 4a to 4e are flowcharts illustrating operation of a vehicle driving assistance apparatus according to an embodiment of the present invention.

Figure 4A:
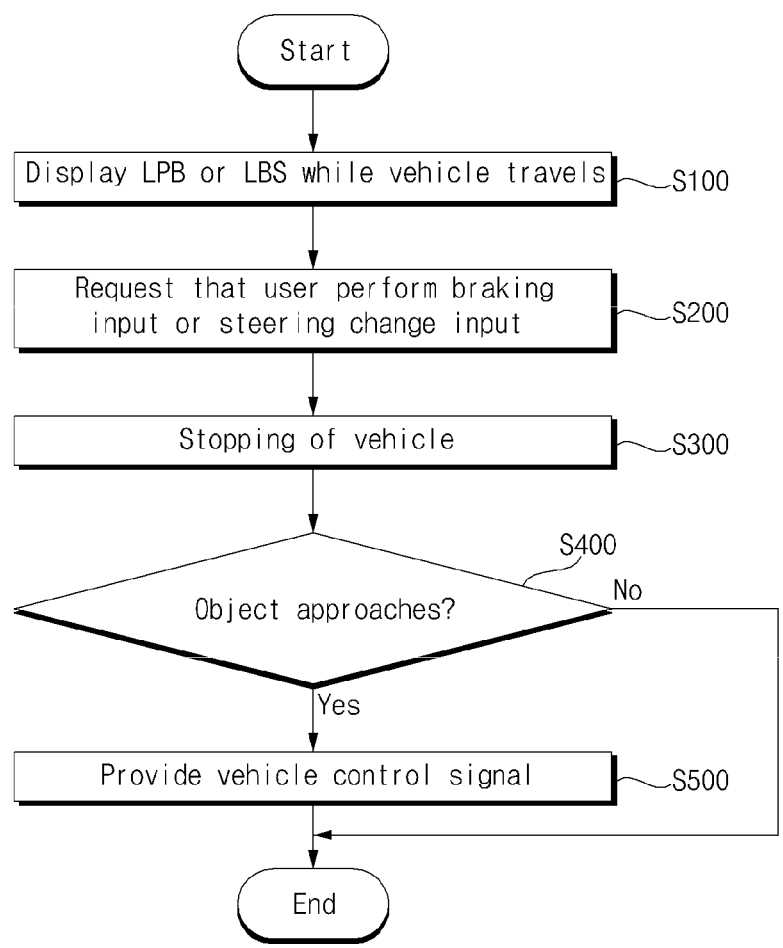
FIGS. 4a to 4e are flowcharts illustrating operation of a vehicle driving assistance apparatus according to an embodiment of the present invention.

Referring to FIG. 4a, the vehicle driving assistance apparatus according to the present invention may display an LPB or an LPS while the vehicle 100 travels and may control movement of the vehicle 100 according to an approaching object when the vehicle stops.

The processor 270 may display the LPB or the LPS on the display unit 280 while the vehicle 100 travels (S100).

The processor 270 may calculate the LPB or the LPS, based on surrounding situation information, while the vehicle 100 travels. The processor 270 may display at least one of the calculated LPB and LPS on the display unit 280.

The LPB and the LPS may be changed in real time according to a relative location between the vehicle 100 and a preceding object, speed of the vehicle 100, braking capability, a tire state, and a road surface state. The processor 270 may display at least one of the LPB and LPS changed in real time on the display unit 280.

The processor 270 may request that a user perform braking input or steering change input, through at least one of the display unit 280 and the alarm unit 290 (S200).

The processor 270 may request that the user perform braking input through at least one of the display unit 280 and the alarm unit 290, before a set time starting from a time at which the vehicle 100 reaches the LPB. If the vehicle 100 reaches the LPB, the processor 270 may provide a vehicle control signal for controlling at least one of the driving apparatus, the steering apparatus, and the brake apparatus of the vehicle 100 so that the vehicle 100 may brake.

The processor 270 may request that the user perform steering change input, through at least one of the display unit 280 and the alarm unit 290, before the set time starting from a time at which the vehicle 100 reaches the LPS. If the vehicle 100 reaches the LPS, the processor 270 may provide the vehicle control signal so that the vehicle 100 may move to a lateral lane.

While the vehicle 100 travels, if an AEB system of the vehicle 100 operates, braking input of a user is performed, or the vehicle collides with a preceding vehicle, the vehicle 100 may stop (S300).

If the vehicle 100 stops while traveling, the processor 127 may determine whether an object sensed by the sensing unit 210 approaches from a traveling lane or a lateral lane of the vehicle 100 (S400).

If it is determined that the object approaches from the traveling lane or the lateral lane of the vehicle 100, the processor 270 may provide the vehicle control signal for controlling at least one of the driving apparatus, the steering apparatus, and the brake apparatus of the vehicle 100 so as to prevent collision between the vehicle 100 and the object or reduce or minimize impulse during collision (S500).

The vehicle 100 may move so as to avoid collision with the object or reduce or minimize impulse during collision according to the vehicle control signal.

Figure 4B:
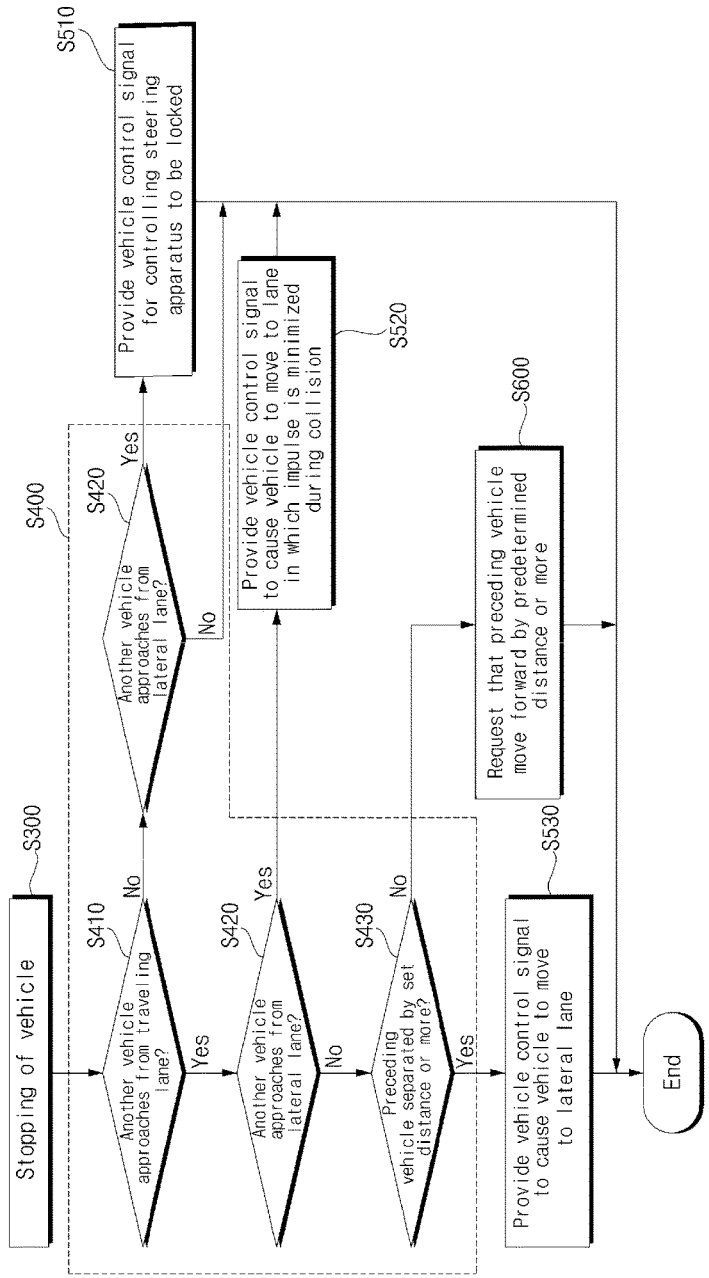

Referring to FIG. 4b, the vehicle driving assistance apparatus according to the present invention can prevent collision between the vehicle 100 and another vehicle by moving the vehicle 100 to a lateral lane.

If the vehicle 100 stops (S300), the processor 270 may determine, based on the surrounding situation information, whether another vehicle approaches from the traveling lane or the lateral lane (S410 and S420).

After determining whether another vehicle approaches from the traveling lane (S410), the processor 270 may determine whether another vehicle approaches from the lateral lane (S420). The above order of the traveling lane and the lateral lane may be reversed.

Upon determining that another vehicle approaches from the lateral lane but not from the traveling lane, the processor 270 may provide a vehicle control signal for controlling the steering apparatus of the vehicle 100 to be locked (S510).

That is, if another vehicle approaches from the lateral lane but not from the traveling lane, since it is safe that the vehicle 100 is located in the traveling lane, the processor 270 may cause the steering apparatus of the vehicle 100 to be locked in order to prevent a driver from involuntarily turning a steering wheel during stopping.

If it is determined that a vehicle approaches from the traveling lane and a vehicle also approaches from the lateral lane, the processor 270 may provide the vehicle control signal so that the vehicle 100 may move to a lane from which a vehicle having a smaller impulse during collision with the vehicle 100 approaches (S520).

If it is determined that a vehicle approaches from the traveling lane and a vehicle approaches from the lateral lane, the processor 270 may determine possibility of collision between the vehicles and the vehicle 100 and impulse occurring during collision, based on the surrounding situation information.

If it is determined that the vehicles have possibility of collision with the vehicle 100, the processor 270 may compare impulse exerted on the vehicle 100 during collision. The processor 270 may provide the vehicle control signal so that the vehicle 100 moves to a lane from which a vehicle having a smaller impulse during collision with the vehicle 100 approaches.

For example, if a heavy truck having possibility of collision with the vehicle 100 approaches from the traveling lane and a general vehicle having possibility of collision with the vehicle 100 approaches from the lateral lane, since a smaller impulse occurs when the vehicle 100 collides with the general vehicle than the heavy truck, the processor 270 may provide the vehicle control signal so that the vehicle 100 may move to the lateral lane. Therefore, the vehicle 100 collides with the general vehicle having a relatively smaller impulse, thereby reducing injury to a driver.

If it is determined that another vehicle approaches from the traveling lane but not from the lateral lane and a distance between the vehicle 100 and a preceding vehicle is equal to or greater than a set distance (S430), the processor 270 may provide the vehicle control signal so that the vehicle 100 may move to the lateral lane (S530).

The set distance may be a minimum distance between the vehicle 100 and the preceding vehicle needed for the vehicle 100 to move to the lateral lane. In order for the vehicle 100 to move to the lateral lane, a predetermined distance should be secured ahead the vehicle 100. Therefore, the processor 270 may cause the vehicle 100 to move to the lateral lane after confirming that the set distance is secured.

If it is determined that another vehicle approaches from the traveling lane but not from the lateral lane and the distance between the vehicle 100 and the preceding vehicle is less than the set distance, the processor 270 may request that the preceding vehicle move forward by a predetermined distance or more, through the communication unit 220 (S600).

If the distance between the vehicle 100 and the preceding vehicle is less than the set distance, the vehicle 100 cannot move to the lateral lane. The processor 270 may determine, based on the surrounding situation information, when the vehicle 100 cannot move to the lateral lane.

If it is determined that the vehicle 100 cannot move to the lateral lane, the processor 270 may request that the preceding vehicle move, through the communication unit 220. The processor 270 may inform the preceding vehicle that there is a vehicle approaching from the traveling lane of the vehicle 100 or request that the preceding vehicle move forward by a predetermined distance or more. For example, the processor 270 may transmit a message to the preceding vehicle.

If it is determined that the vehicle 100 cannot move to the lateral lane, the processor 270 may request that the preceding vehicle move by sounding a horn of the vehicle 100.

Figure 4C:
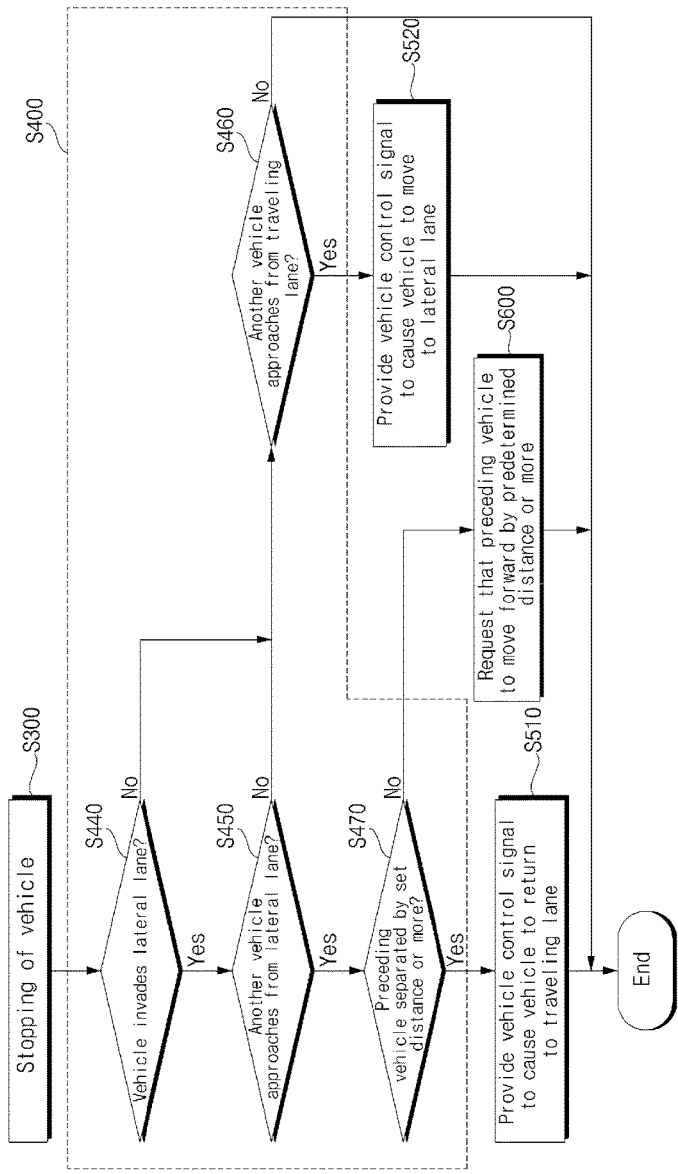

Referring to FIG. 4c, the vehicle driving assistance apparatus according to the present invention may cause a vehicle to return to an original traveling lane when the vehicle invades a lateral lane while stopping.

If the vehicle 100 stops (S300), the processor 270 may determine whether the vehicle 100 invades the lateral lane, based on the surrounding situation information (S440).

If the vehicle 100 stops due to collision with another vehicle or a driver rapidly manipulates a steering wheel while the vehicle 100 brakes, the vehicle 100 may invade the lateral lane.

The processor 270 may determine whether the vehicle 100 crosses the lateral lane, based on the surrounding situation information, by determining where an original traveling lane of the vehicle 100 is and where the vehicle 100 is currently located.

If it is determined that the vehicle 100 crosses the lateral lane while stopping, the processor 270 may determine, based on the surrounding situation information, whether another vehicle approaches from the lateral lane, (S450).

The processor 270 may determine, based on the surrounding situation information, whether another vehicle approaching from the lateral lane has possibility of collision with the vehicle 100.

Upon determining that a vehicle having possibility of collision approaches from the lateral lane that the vehicle 100 has invaded, the processor 270 may determine, based on the surrounding situation information, whether a distance between the vehicle 100 and a preceding vehicle is equal to or greater than a set distance (S470).

The set distance may be a minimum distance needed for the vehicle 100 that invades the lateral lane to return to the original traveling lane. If it is determined that the distance between the vehicle 100 and the preceding vehicle is equal to or greater than the set distance, the processor 270 may determine that the vehicle 100 can return to the original lane without collision with the preceding vehicle.

If it is determined that the distance between the vehicle 100 and the preceding vehicle is equal to or greater than the set distance, the processor 270 may provide a vehicle control signal so that the vehicle 100 may move to the traveling lane (S510).

The vehicle 100 may move to the traveling lane in correspondence to the vehicle control signal. Therefore, the vehicle 100 can avoid collision with another vehicle approaching from the lateral lane.

If it is determined that the distance between the vehicle 100 and the preceding vehicle is less than the set distance, the processor 270 may request that the preceding vehicle move forward by a predetermined distance or more, through the communication unit 220 (S600).

If it is determined that the distance between the vehicle 100 and the preceding vehicle is less than the set distance, the processor 270 may determine that the vehicle 100 cannot return to the original traveling lane without collision with the preceding vehicle.

Upon determining that the vehicle 100 cannot return to the original traveling lane, the processor 270 may request that the preceding vehicle move forward, through the communication unit 220. The processor 270 may inform the preceding vehicle that another vehicle approaches from the traveling lane of the vehicle 100 or request that the preceding vehicle move forward by a predetermined distance or more. For example, the processor 270 may transmit a message to the preceding vehicle.

Upon determining that the vehicle 100 cannot move to the lateral lane, the processor 270 may request that the preceding vehicle move by sounding a horn of the vehicle 100.

If it is determined that the vehicle 100 does not cross the lateral lane while stopping, the processor 270 may determine, based on the surrounding situation information, whether another vehicle approaches from the traveling lane (S460). Upon determining that another vehicle having possibility of collision with the vehicle 100 does not approach from the lateral lane although the vehicle 100 has invaded the lateral lane while stopping, the processor 270 may determine whether another vehicle approaches from the traveling lane (S460).

Upon determining that another vehicle approaches from the traveling lane, the processor 270 may provide the vehicle control signal so that the vehicle 100 may move to the lateral lane (S520).

If a vehicle having possibility of collision with the vehicle 100 is present in the traveling lane but not in the lateral lane, since the vehicle 100 should move to the lateral lane to avoid collision with the other vehicle, the processor 270 may provide the signal so that the vehicle 100°| may move to the lateral lane. The vehicle 100 may fully move to the lateral lane, thereby avoiding collision with the other vehicle approaching from the traveling lane.

Figure 4D:
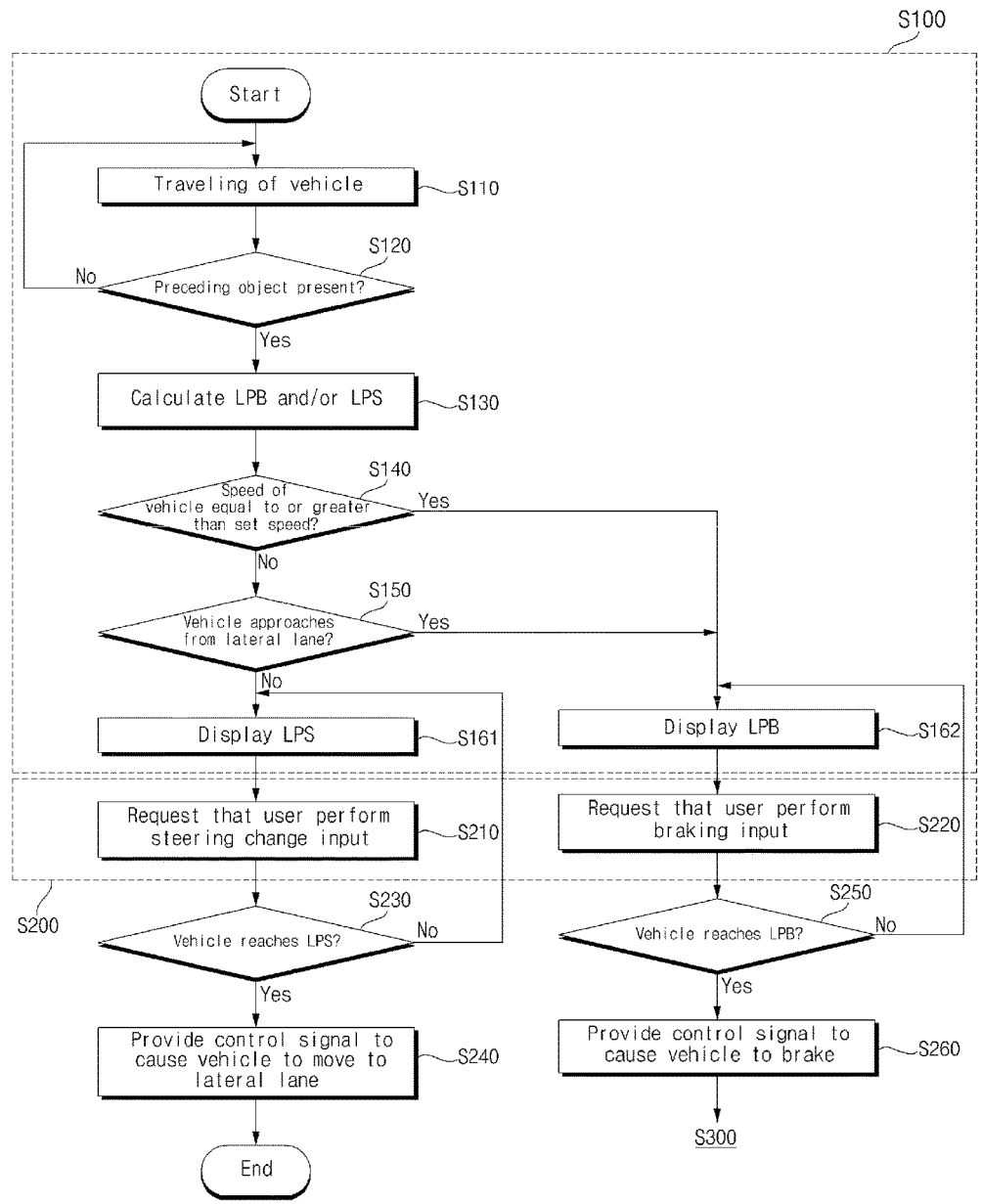

Referring to FIG. 4d, the vehicle driving assistance apparatus according to the present invention may display an LPB or an LPS while a vehicle travels.

While the vehicle 100 travels (S110), the processor 270 may determine, based on the surrounding situation information, whether an object is present in front of the vehicle 100 (S120).

Upon determining, based on the surrounding situation information, that the preceding object is present, the processor 270 may calculate at least one of the LPB and the LPS for preventing the vehicle 100 from colliding with the preceding object (S130).

The LPB may be a point nearest the preceding object among points at which the vehicle 100 starts to brake in order not to collide with the preceding object while traveling. The LPS may be a point nearest the preceding object among points at which the vehicle 100 starts to steer in order to avoid collision with the preceding object while traveling.

The LPB or the LPS may differ according to a relative location between the vehicle 100 and the preceding object, speed of the vehicle 100, braking capability, weight of the vehicle 100, a tire state, and a road surface state. Since information about the speed of the vehicle 100, braking capability, weight of the vehicle 100, a tire state, and a road surface state is included in the surrounding situation information, the processor 270 may calculate the LPB or the LPS based on the above information.

The processor 270 may determine, based on the surrounding situation information, whether speed of the vehicle 100 is equal to or greater than a set speed (S140).

If the speed of the vehicle 100 is equal to or greater than a specific speed, the vehicle 100 first reaches the LPB than the LPS. If the speed of the vehicle 100 is less than the specific speed, the vehicle 100 first reaches the LPS than the LPB. The specific speed may be determined by experimentation. The set speed may be the specific speed and may be a value stored in the memory 240.

If the speed of the vehicle 100 is equal to or greater than the set speed, since the vehicle 100 first reaches the LPB, the processor 270 may display the LPB on the display unit 280 (S162).

If the speed of the vehicle 100 is less than the set speed, processor 270 may determine, based on the surrounding situation information, whether a vehicle having possibility of collision with the vehicle 100 approaches from the lateral lane (S150).

If it is determined that another vehicle having possibility of collision with the vehicle 100 approaches from the lateral lane (S150) although it is determined that the speed of the vehicle is less than the set speed, since the vehicle 100 may collide with the other vehicle when steering of the vehicle 100 is changed, the processor 270 may display the LPB on the display unit 280 (S162).

After displaying the LPB on the display unit 280, the processor 270 may request that a user perform braking input within a set time starting from a time at which the vehicle 100 reaches the LPB, through at least one of the display unit 280 and the alarm unit 290 (S220).

The set time is a time which is set such that a driver copes with braking before the vehicle 100 reaches the LPB. If the vehicle 100 does not brake at a moment reaching the LPB, since collision between the vehicle 100 and a preceding object may occur, the driver needs to operate a braking apparatus before the vehicle 100 reaches the LPB.

For example, if the set time is 3 seconds, the processor 270 may display a message requesting that the user perform braking input on the display unit 280 and may simultaneously generate sound and vibration through the alarm unit 290, within 3 seconds before the vehicle 100 reaches the LPB.

The processor 270 may determine whether the vehicle 100 reaches the LPB, based on the surrounding situation information (S250).

If it is determined that the vehicle 100 reaches the LPB, the processor 27 may provide a vehicle control signal so that the vehicle 100 brakes (S260). Then, the vehicle 100 may stop (S300).

If it is determined that the speed of the vehicle 100 is less than the set speed and there is no vehicle having possibility of collision with the vehicle 100 in the lateral lane, since the vehicle 100 first reaches the LPS, the processor 270 may display the LPS on the display unit 280 (S161).

After displaying the LPS on the display unit 28, the processor 270 may request that a user perform steering change input within the set time starting from a time at which the vehicle 100 reaches the LPS, through at least one of the display unit 280 and the alarm unit 290 (S210).

The set time is a time which is set such that the driver copes with steering before the vehicle 100 reaches the LPS. If the vehicle 100 does not change steering upon reaching the LPS, since collision between the vehicle 100 and a preceding object may occur, the driver needs to operate a steering apparatus before the vehicle 100 reaches the LPS.

For example, if the set time is 2 seconds, the processor 270 may display a message requesting that the user turn a steering wheel on the display unit 280 within 2 seconds before the vehicle 100 reaches the LPS and simultaneously generate sound and vibration through the alarm unit 290.

The processor 270 may determine whether the vehicle 100 reaches the LPS, based on the surrounding situation information (S230).

If the vehicle 100 reaches the LPS, the processor may provide the vehicle control signal so that the vehicle 100 may move to the lateral lane (S240). In this case, the vehicle 100 may move to the lateral lane.

Figure 4E:
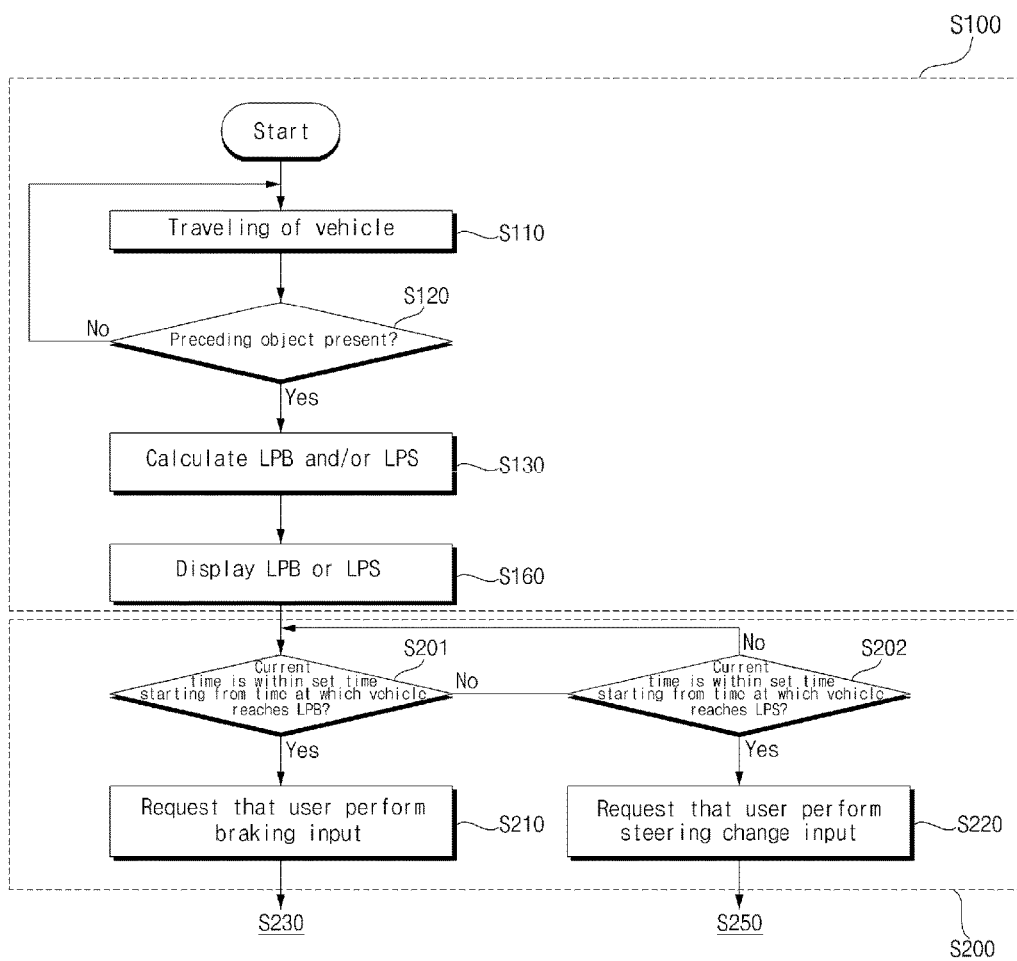

Referring to FIG. 4e, the vehicle driving assistance apparatus according to the present invention may generate an alarm according to an LPB or an LPS.

While the vehicle 100 travels (S110), the processor 270 may determine whether there is an object in front of the vehicle 100, based on the surrounding situation information (S120).

If it is determined that there is a preceding object, the processor 27 may calculate at least one of an LPB and an LPS for preventing the vehicle 100 from colliding with the preceding object, based on the surrounding situation information (S130).

According to whether speed of the vehicle 100 is equal to or greater than the set speed and another vehicle having possibility of collision with the vehicle 100 is present in a lateral lane, the processor 270 may display the LPS or the LPB on the display unit 280 (S160).

After displaying the LPB on the display unit 280, the processor 270 may determine, based on the surrounding situation information, whether it is a time within a set time starting from a time at which the vehicle 100 reaches the LPB (S201).

For example, if the set time is 3 seconds, the processor 270 may determine whether a current time is within 3 seconds before the vehicle 100 reaches the LPB.

The processor 270 may request that a user perform braking input within the set time staring from the time when the vehicle 100 reaches the LPB, through at least one of the display unit 280 and the alarm unit 290 (S201).

If the vehicle 100 does not brake upon reaching the LPB, since collision between the vehicle 100 and the preceding object may occur, the processor 270 may cause the user to operate the braking apparatus by requesting that the user perform braking input before the vehicle 100 reaches the LPB.

After displaying the LPS on the display unit 280, the processor 270 may determine, based on the surrounding situation information, whether it is a time within the set time starting from the time when the vehicle 100 reaches the LPS (S202).

For example, if the set time is 2 seconds, the processor 270 may determine whether a current time is within 2 seconds until the vehicle 100 reaches the LPS.

The processor 270 may request that a user perform steering change input within the set time starting from the time when the vehicle 100 reaches the LPS, through at least one of the display unit 280 and the alarm unit 290 (S220).

If steering of the vehicle 100 is not changed upon reaching the LPS, since collision between the vehicle 100 and the preceding object may occur, the processor 270 may cause the user to operate the steering apparatus by requesting that the user perform steering change input before the vehicle 100 reaches the LPS.

Figure 5A:
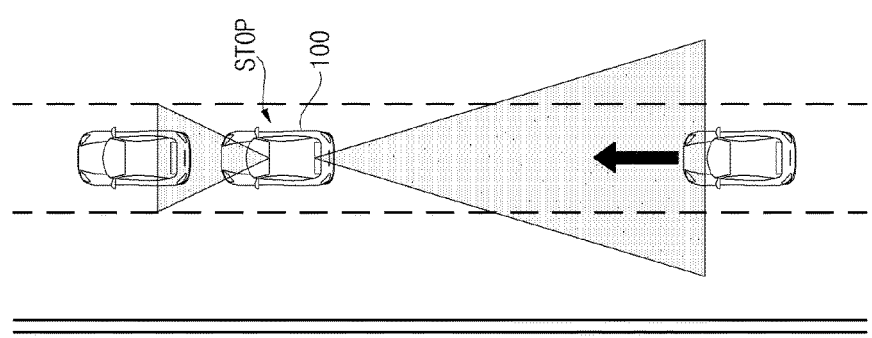
FIGS. 5a and 5b are diagrams illustrating a situation in which a vehicle stops while traveling according to an embodiment of the present invention.
Figure 5A:
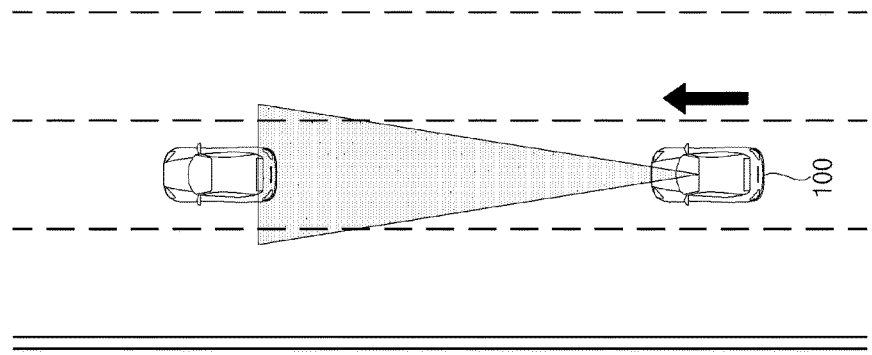
Figure 5B:
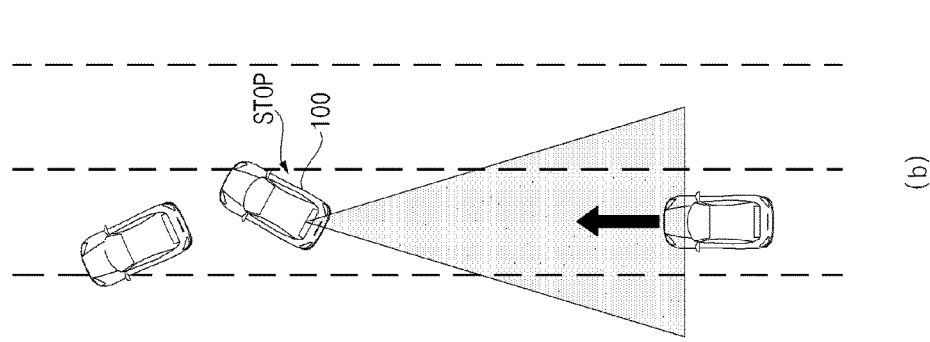
Figure 5B:
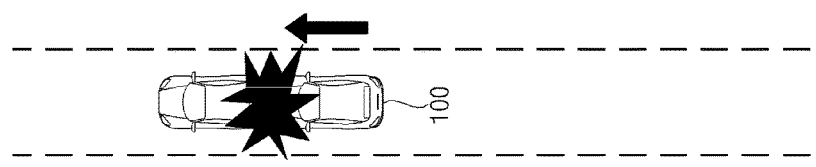

FIGS. 5*a* and 5*b* are diagrams illustrating a situation in which the vehicle 100 stops while traveling according to an embodiment of the present invention.

Referring to FIG. 5*a*, the vehicle 100 according to the present invention may stop due to operation of an AEB system.

Referring to (a) of FIG. 5*a*, the processor may sense, through the sensing unit 210, that there is a vehicle in front of the vehicle 100 while the vehicle 100 travels.

Referring to (b) of FIG. 5*a*, the processor 270 operates the AEB system of the vehicle 100, thereby stopping the vehicle 100 so as to prevent collision between the vehicle 100 and the preceding vehicle. If the vehicle 100 stops, the processor 270 may sense, through the sensing unit 210, another vehicle approaching from the rear of a traveling lane.

Referring to FIG. 5*b*, the vehicle 100 according to the present invention may stop due to collision with a preceding vehicle.

Referring to (a) of FIG. 5*b*, the vehicle 100 may collide with the preceding vehicle while traveling.

Referring to (b) of FIG. 5*b*, if the vehicle 100 collides with a preceding vehicle, the vehicle 100 may stop while crossing a lateral lane. If the vehicle 100 stops, the processor 270 may sense, through the sensing unit 210, another vehicle approaching from the rear of a traveling lane.

The vehicle 100 may stop by braking input of a user.

Figure 6:
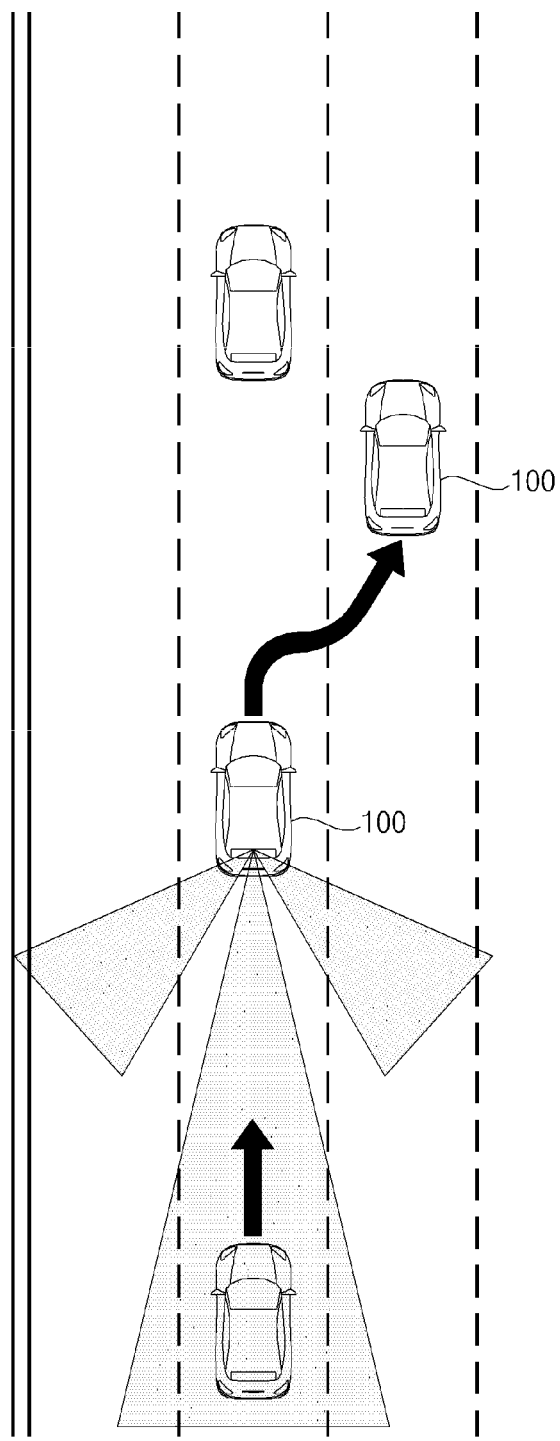
FIG. 6 is a diagram illustrating a situation in which a vehicle driving assistance apparatus controls a vehicle to move to a lateral lane according to an embodiment of the present invention.

FIG. 6 is a diagram illustrating a situation in which a vehicle driving assistance apparatus controls a vehicle to move to a lateral lane according to an embodiment of the present invention.

The processor 270 may determine, based on the surrounding situation information, whether a vehicle having possibility of collision with the vehicle 100 approaches from a traveling lane of the vehicle 100. Since the vehicle approaches from the traveling lane of the vehicle 100, the processor 270 may prevent collision between the vehicle 100 and the vehicle by moving the vehicle 100 to a lateral lane.

The processor 270 may determine, based on the surrounding situation information, whether a vehicle having possibility of collision with the vehicle 100 approaches from the lateral lane of the vehicle 100. If the vehicle approaches even from the lateral lane to which the vehicle 100 is to move, since collision between the vehicle 100 and the vehicle may occur, the processor 270 may confirm that there is no vehicle approaching from the lateral lane to which the vehicle 100 is to move.

The processor 270 may determine, based on the surrounding situation information, whether a distance between the vehicle 100 and a preceding vehicle is equal to or greater than a set distance. In order for the vehicle 100 move to the lateral lane, since a predetermined distance is needed in front of the vehicle 100, the processor 270 may move the vehicle 100 to the lateral lane after confirming that the set distance is secured.

If it is determined, based on the surrounding situation information, that there is a vehicle having possibility of collision with the vehicle 100 in the traveling lane, there is no vehicle having possibility of collision with the vehicle 100 in the lateral lane, and the distance between the vehicle 100 and the preceding object is equal to or greater than the set distance, the processor 270 may provide a vehicle control signal so that the vehicle 100 may move to the lateral lane.

The vehicle 100 may move to the lateral lane in correspondence to the vehicle control signal. The vehicle 100 may avoid collision with the vehicle approaching from the traveling lane by moving to the lateral lane.

Figure 7:
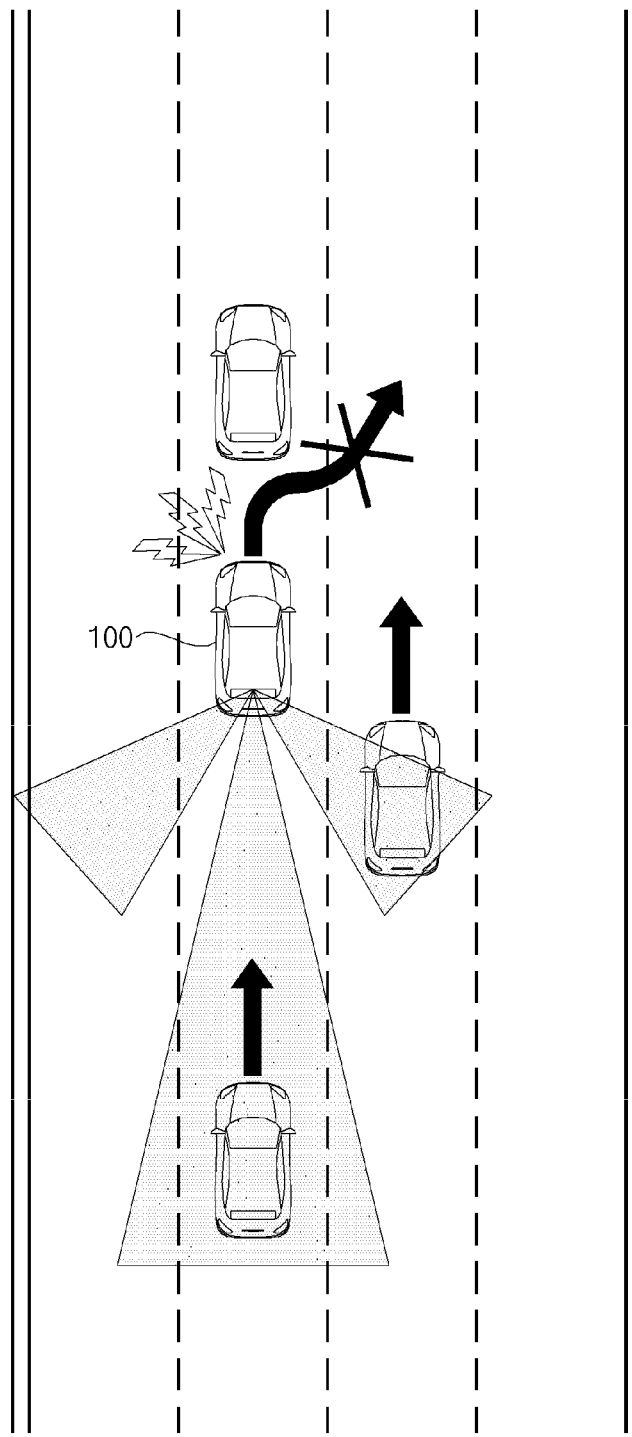
FIG. 7 is a diagram illustrating a situation in which a vehicle driving assistance apparatus requests that a preceding vehicle move when a vehicle cannot move to a lateral lane according to an embodiment of the present invention.

FIG. 7 is a diagram illustrating a situation in which a vehicle driving assistance apparatus requests that a preceding vehicle move when a vehicle cannot move to a lateral lane according to an embodiment of the present invention.

If it is determined, based on the surrounding situation information, that a distance between the vehicle 100 and a preceding vehicle is less than the set distance or a vehicle having possibility of collision with the vehicle 100 approaches from the lateral lane, the processor 270 may inform the preceding vehicle that there is a vehicle approaching from a traveling lane of the vehicle 100 or request that the preceding vehicle move forward by a predetermined distance or more, through the communication unit 220. For example, the possibility of collision can be determined based on a probability of collision as described above.

If the distance between the vehicle 100 and the preceding vehicle is less than the set distance, the vehicle 100 cannot move to the lateral lane.

Even when another vehicle having possibility of collision with the vehicle 100 approaches from the lateral lane to which the vehicle 100 is to move, since collision with the vehicle may occur, the vehicle 100 cannot move to the lateral lane.

The processor 270 may determine, based on the surrounding situation information, when the vehicle 100 cannot move to the lateral lane.

If it is determined that the vehicle 100 cannot move to the lateral lane, the processor 270 may request that the preceding vehicle move, through the communication unit 220.

The processor 270 may inform the preceding vehicle that there is a vehicle approaching from the traveling lane of the vehicle 100 or request that the preceding vehicle move forward by a predetermined distance or more. For example, the processor 270 may transmit a message to the preceding vehicle.

If it is determined that the vehicle 100 cannot move to the lateral lane, the processor 270 may request that the preceding vehicle move by sounding a horn of the vehicle 100.

Figure 8:
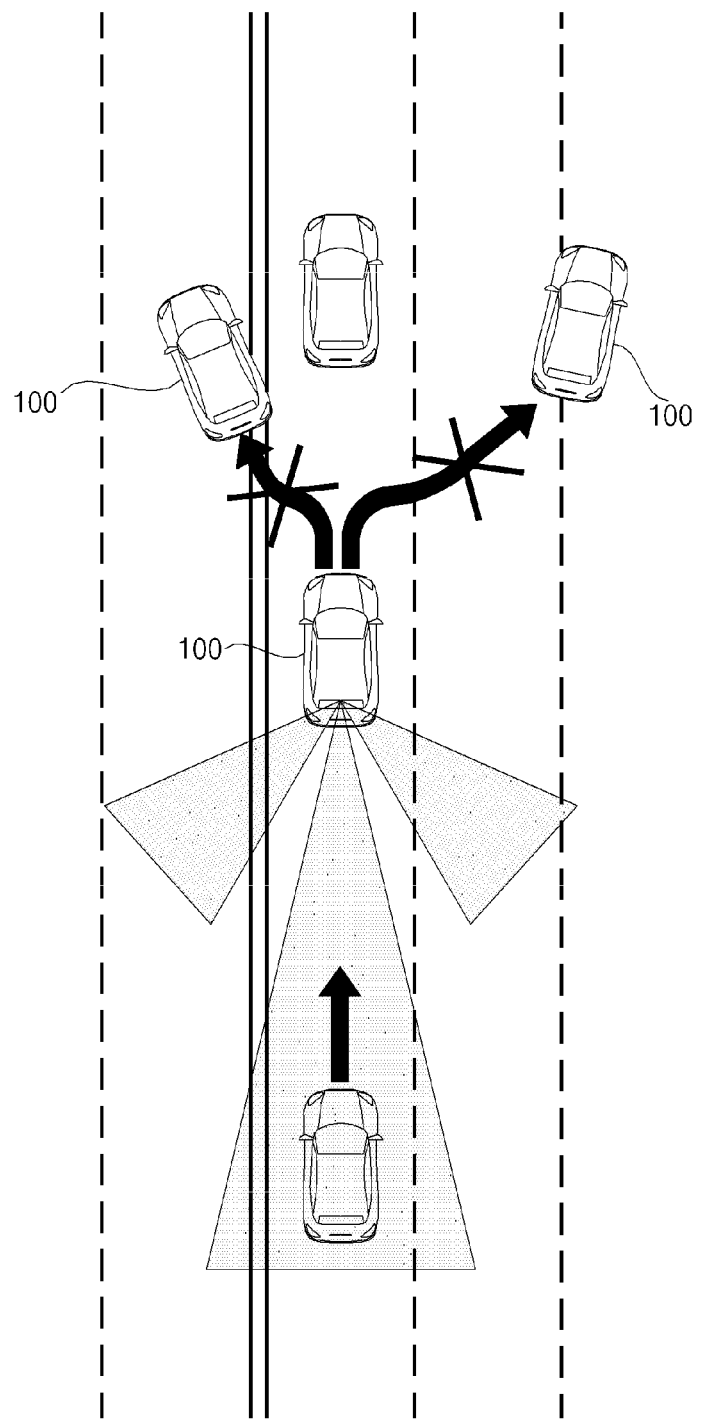
FIG. 8 is a diagram illustrating a situation in which a vehicle driving assistance apparatus causes a vehicle not to cross a centerline or not to cross two or more lateral lanes when the vehicle moves to the lateral lane according to an embodiment of the present invention.

FIG. 8 is a diagram illustrating a situation in which a vehicle driving assistance apparatus causes a vehicle not to cross a centerline or not to cross two or more lateral lanes when the vehicle moves to the lateral lane according to an embodiment of the present invention.

If the vehicle 100 moves to the lateral lane, the processor may provide a vehicle control signal so that the vehicle 100 may not cross a centerline or two or more lanes.

If the vehicle 100 crosses a centerline or two or more lateral lanes, since there is a collision possibility, the processor 270 may cause the vehicle 100 to cross only one lane without crossing a centerline or two or more lateral lanes. For example, the possibility of collision can be determined based on a probability of collision as described above.

Figure 9:
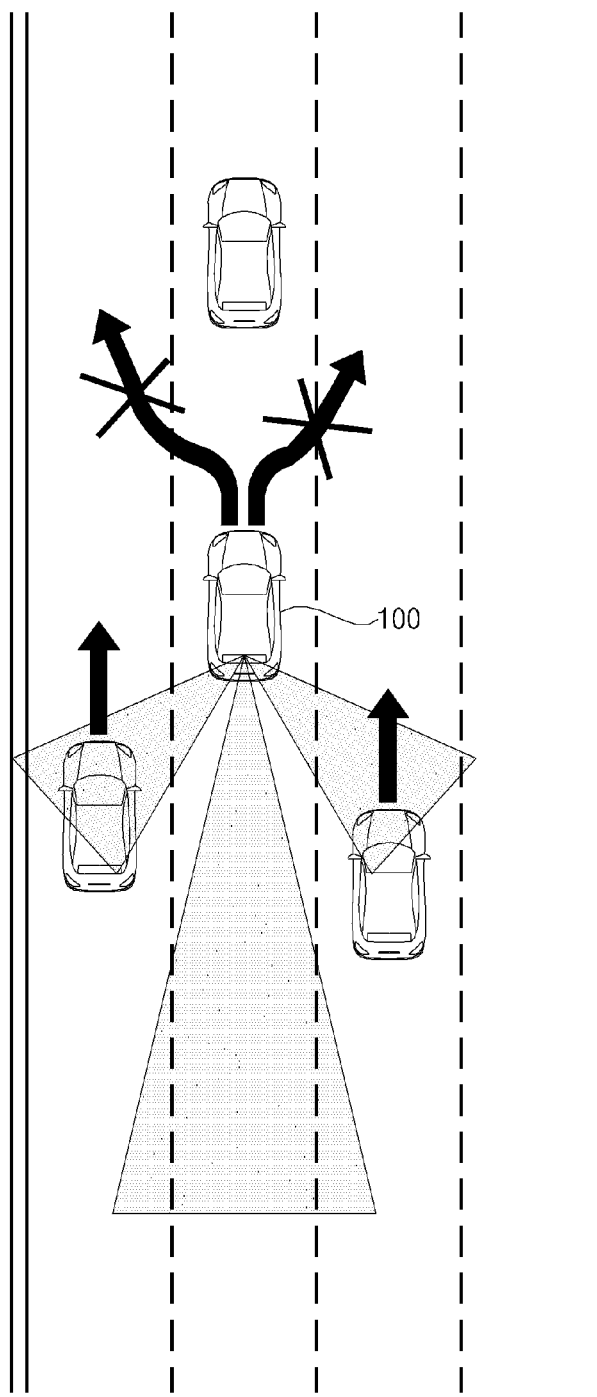
FIG. 9 is a diagram illustrating a situation in which a vehicle driving assistance apparatus controls a steering apparatus of a vehicle to be locked when it is determined that another vehicle approaches from a lateral lane of the vehicle according to an embodiment of the present invention.

FIG. 9 is a diagram illustrating a situation in which a vehicle driving assistance apparatus controls a steering apparatus of a vehicle to be locked when it is determined that another vehicle approaches from a lateral lane of the vehicle according to an embodiment of the present invention.

If it is determined, based on the surrounding situation information, that a vehicle having possibility of collision with the vehicle 100 approaches from the lateral lane while the vehicle 100 stops, the processor 270 may provide a vehicle control signal for locking the steering apparatus of the vehicle 100.

When the vehicle 100 stops, a driver may involuntarily turn a steering wheel, which is the steering apparatus. In this case, if a vehicle having possibility of collision with the vehicle 100 approaches from a lateral lane to which the steering wheel turns, collision may occur.

To prevent such a situation, the processor 270 may provide the vehicle control signal so that the steering apparatus of the vehicle 100 may be locked upon determining that a vehicle having possibility of collision with the vehicle 100 approaches from the lateral lane while the vehicle 100 stops.

Figure 10:
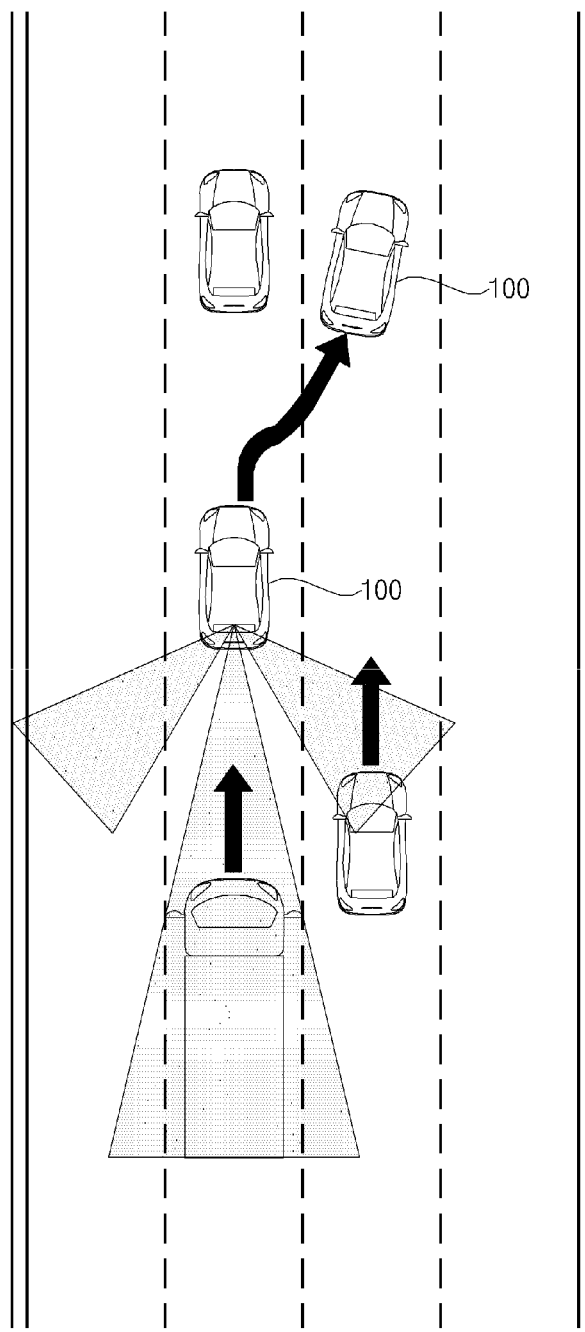
FIG. 10 is a diagram illustrating a situation in which a vehicle driving assistance apparatus controls a vehicle to move to a lane from which another vehicle having a smaller impulse during collision with the vehicle approaches when vehicles are present in a lateral lane and the back of a traveling lane of the vehicle according to an embodiment of the present invention.

FIG. 10 is a diagram illustrating a situation in which a vehicle driving assistance apparatus controls a vehicle to move to a lane from which another vehicle having a smaller impulse during collision with the vehicle approaches when vehicles are present in a lateral lane and the back of a traveling lane of the vehicle according to an embodiment of the present invention.

For example, if a heavy truck having possibility of collision with the vehicle 100 approaches from a traveling lane and a general vehicle having possibility of collision with the vehicle 100 approaches from a lateral lane, since a smaller impulse is exerted on the vehicle 100 when the vehicle 100 collides with the general vehicle than the heavy truck, the processor 270 may provide the vehicle control signal so that the vehicle 100 may move to the lateral lane. Therefore, the vehicle 100 collides with the general vehicle having a relatively smaller impulse, thereby reducing victim of a driver. In this example, the possibility of collision can be determined based on a probability of collision as described above.

If it is determined, based on the surrounding situation information, that a vehicle approaching from the traveling lane and a vehicle approaching from the lateral lane have possibility of collision with the vehicle 100, the processor 270 may provide the vehicle control signal so that the vehicle 100 may move to a lane from which a vehicle having a smaller impulse during collision with the vehicle 100 approaches.

If a vehicle approaches from the traveling lane and a vehicle approaches even from the lateral lane, the processor 270 may determine, based on the surrounding situation information, that there is possibility of collision between the vehicles and the vehicle 100.

If the vehicle 100 is located in the traveling lane, the processor 270 may determine possibility of collision with a vehicle approaching from the traveling lane and impulse exerted on the vehicle 100 during collision, based on the surrounding situation information. If the vehicle 100 moves to the lateral lane, the processor 270 may determine possibility of collision with a vehicle approaching from the lateral lane and impulse exerted on the vehicle 100 during collision, based on the surrounding situation information.

If it is determined that all of the vehicles have possibility of collision with the vehicle 100, the processor 270 may compare impulse exerted on the vehicle 100 during collision. The processor 270 may provide the vehicle control signal so that the vehicle 100 moves to a lane from which a vehicle having a smaller impulse during collision with the vehicle 100 approaches.

Figure 11:
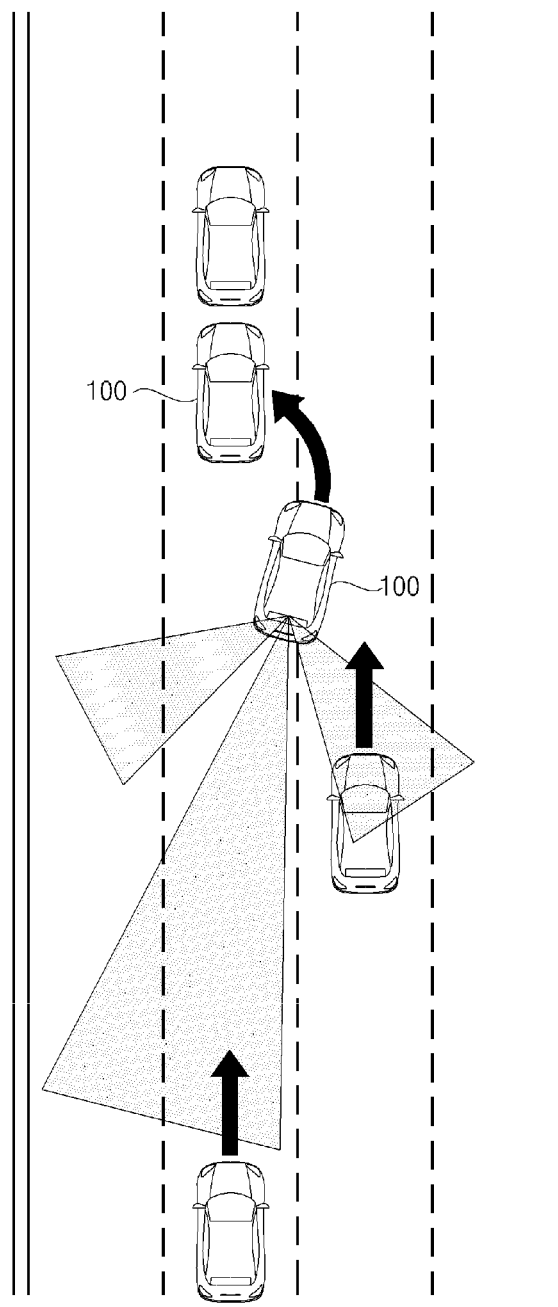
FIG. 11 is a diagram illustrating a situation in which a vehicle driving assistance apparatus controls a vehicle to return to a traveling lane when the vehicle invades a lateral lane while stopping according to an embodiment of the present invention.

FIG. 11 is a diagram illustrating a situation in which a vehicle driving assistance apparatus controls a vehicle to return to a traveling lane when the vehicle invades a lateral lane while stopping according to an embodiment of the present invention.

The processor 270 may determine, based on the surrounding situation information, that the vehicle 100 crosses a lateral lane while stopping. The processor 270 may determine whether the vehicle 100 crosses the lateral lane, based on the surrounding situation information, by determining where an original traveling lane of the vehicle 100 is and in which lane the vehicle 100 is currently located.

If it is determined that the vehicle 100 crosses the lateral lane while stopping, the processor 270 may determine whether another vehicle approaches from the lateral lane that the vehicle has invaded, based on the surrounding situation information.

If it is determined that a vehicle having possibility of collision with the vehicle 100 approaches from the lateral lane that the vehicle 100 has invaded, the processor 270 may determine whether a vehicle approaches from a traveling lane to which the vehicle 100 is to move. For example, the possibility of collision can be determined based on a probability of collision as described above.

If it is determined that there is no possibility of collision because a vehicle approaching from the traveling lane is distant from the vehicle 100, the processor 270 may determine that a vehicle having possibility of collision does not approach from the traveling lane. For example, the processor can determine that there is possibility of collision if a probability of collision does not satisfy a threshold. That is, for example, if the probability of collision is less than 20%, the processor 270 can determine that there is no possibility of collision.

The processor 270 may determine a distance between the vehicle 100 and a preceding vehicle, based on the surrounding situation information. The processor 270 may determine whether the vehicle 100 can return to the original traveling lane without collision with the preceding vehicle by determining whether the distance between the vehicle 100 and the preceding vehicle is equal to or greater than a set distance.

If it is determined, based on the surrounding situation information, that a vehicle having possibility of collision with the vehicle 100 approaches from the lateral lane that the vehicle 100 has invaded, the distance between the vehicle 100 and the preceding vehicle is equal to or greater than the set distance, and there is no vehicle having possibility of collision with the vehicle 100 in the traveling lane, the processor 270 may provide the vehicle control signal so that the vehicle 100 may move to the traveling lane.

The vehicle 100 can avoid collision with another vehicle approaching from the lateral lane by moving to the traveling lane in correspondence to the vehicle control signal. Next, the processor 270 may control the vehicle 100 to move to a left lateral lane to prevent collision between a vehicle approaching from the traveling lane and the vehicle 100.

Unlike this, if it is determined that a vehicle approaches from the lateral lane that the vehicle 100 has invaded and another vehicle approaches from the traveling lane, the processor 270 may determine which vehicle has a smaller impulse during collision, based on the surrounding situation information. The processor 270 may cause the vehicle 100 to move to a lane in which a smaller impulse is exerted on the vehicle 100 during collision.

Figure 12:
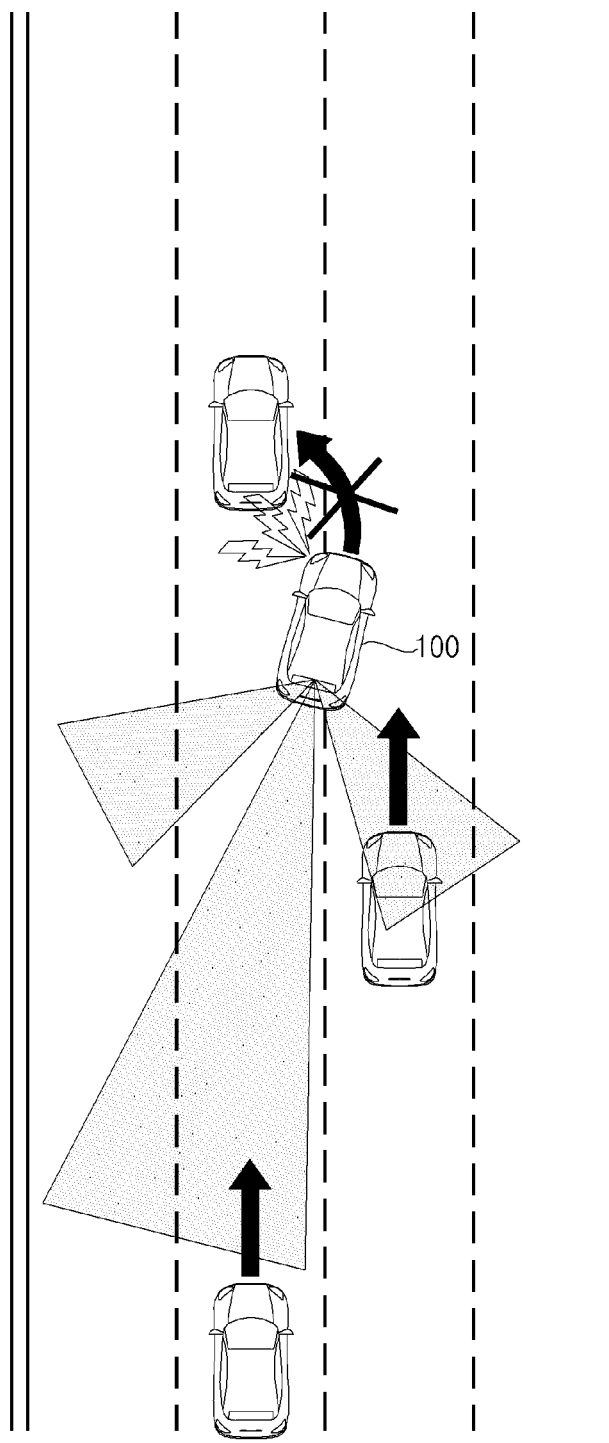
FIG. 12 is a diagram illustrating a situation in which a vehicle driving assistance apparatus requests that a preceding vehicle move when a vehicle cannot return to a traveling lane according to an embodiment of the present invention.

FIG. 12 is a diagram illustrating a situation in which a vehicle driving assistance apparatus requests that a preceding vehicle move when a vehicle cannot return to a traveling lane according to an embodiment of the present invention.

If it is determined, based on the surrounding situation information, that a vehicle having possibility of collision approaches from a lateral lane that the vehicle 100 has invaded and a distance between the vehicle 100 and a preceding vehicle is less than the set distance, the processor 270 may inform the preceding vehicle that there is a vehicle approaching from a traveling lane or request that the preceding vehicle move forward by a predetermined distance or more, through the communication unit 220.

If a vehicle having possibility of collision with the vehicle 100 approaches from the lateral lane that the vehicle 100 has invaded, the processor 270 may determine whether the set distance between the vehicle 100 and the preceding vehicle is equal to or greater than the set distance to determine whether the vehicle 100 may return to the original traveling lane while not colliding with the preceding vehicle.

If it is determined that the distance between the vehicle 100 and the preceding vehicle is less than the set distance, the processor 270 may determine that the vehicle 100 cannot return to an original traveling lane without collision with the preceding vehicle.

If it is determined that the vehicle 100 cannot return to the original traveling lane, the processor 270 may inform the preceding vehicle that a vehicle approaches or request that the preceding vehicle move forward by a predetermined distance or more, through the communication unit 220. For example, the processor 270 may transmit a message to the preceding vehicle.

If it is determined that the vehicle 100 cannot move to the lateral lane, the processor 270 may request that the preceding vehicle move by sounding a horn of the vehicle.

Figure 13:
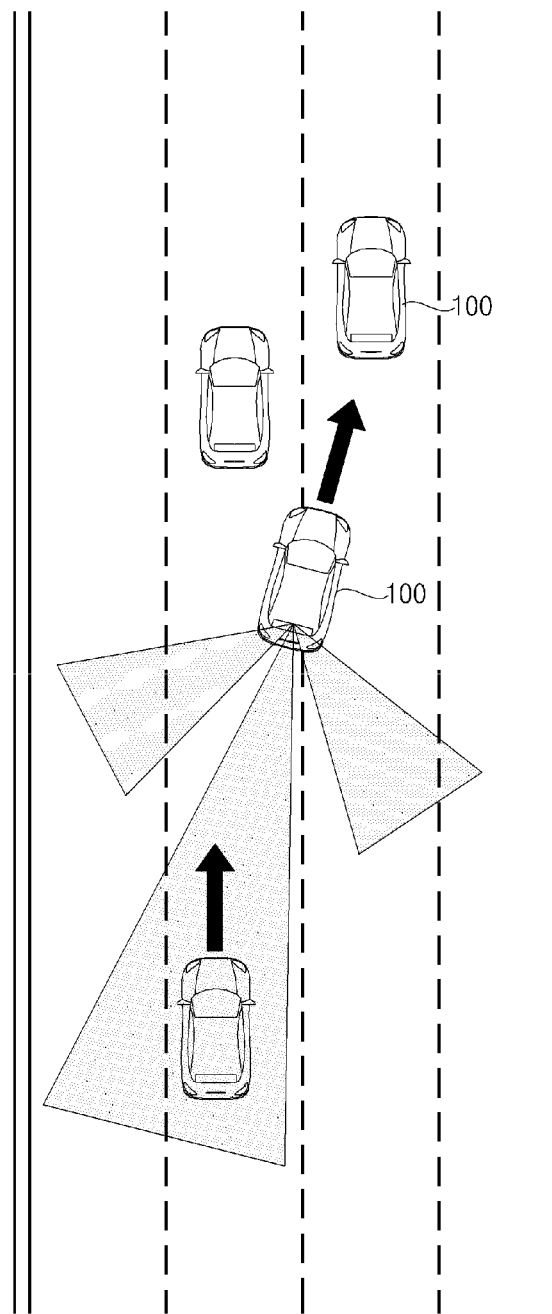
FIG. 13 is a diagram illustrating a situation in which a vehicle driving assistance apparatus controls a vehicle to move to a lateral lane when the vehicle does not need to return to a traveling lane according to an embodiment of the present invention.

FIG. 13 is a diagram illustrating a situation in which a vehicle driving assistance apparatus controls a vehicle to move to a lateral lane when the vehicle does not need to return to a traveling lane according to an embodiment of the present invention.

If it is determined, based on the surrounding situation information, that there is no vehicle approaching from a lateral lane that the vehicle 100 has invaded and a vehicle having possibility of collision approaches from a traveling lane, the processor 270 may provide the vehicle control signal so that the vehicle 100 may move to the lateral lane.

The processor 270 may determine, based on the surrounding situation information, whether a vehicle approaches from the lateral lane that the vehicle 100 has invaded and whether a vehicle approaches from the traveling lane.

If a vehicle having possibility of collision with the vehicle 100 is present in the traveling lane but not in the lateral lane, since the vehicle 100 should move to the lateral lane to avoid collision with another vehicle, the processor 270 may provide the vehicle control signal so that the vehicle 100 may move to the lateral lane.

The vehicle 100 may fully move to the lateral lane, thereby avoiding collision with another vehicle approaching from the traveling lane.

Figure 14:
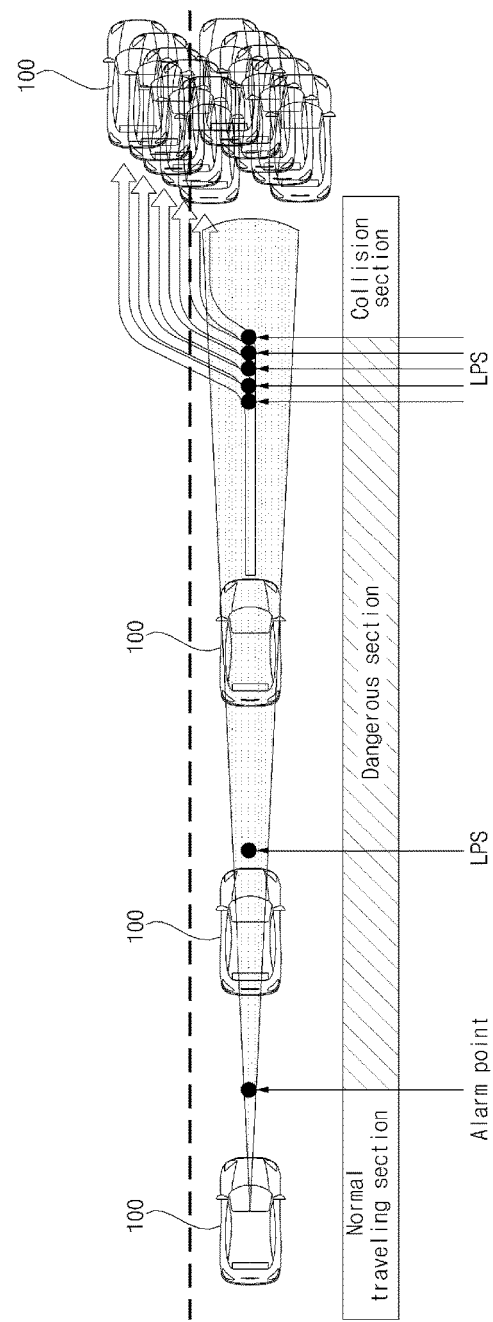
FIG. 14 is a diagram illustrating a situation in which a vehicle driving assistance apparatus displays an LPB and an LPS according to an embodiment of the present invention.

FIG. 14 is a diagram illustrating a situation in which a vehicle driving assistance apparatus displays an LPB and an LPS according to an embodiment of the present invention.

If there is a preceding object while the vehicle 100 travels, the processor 270 may calculate, based on the surrounding situation information, at least one of an LPB and an LPS for preventing the vehicle 100 from colliding with the preceding object.

The processor 270 may display at least one of the LPB and the LPS on the display unit 280.

The LPB may be a point which is nearest the preceding object among points at which the vehicle 100 starts to brake in order not to collide with the preceding object while traveling. For example, the LPB may be a point separated from the preceding object by a minimum braking distance of the vehicle 100. Upon receiving maximum braking input at the LPB while traveling, the vehicle 100 may stop without collision with the preceding object.

The LPS may be a point nearest the preceding object among points at which the vehicle 100 starts to steer in order to avoid collision with the preceding object while traveling. For example, the vehicle 100 may not collide with the preceding object when the steering wheel of the vehicle 100 turns at the LPS while traveling.

Since the LPB and the LPS may be changed in real time according to a relative location between the vehicle 100 and the preceding object, speed of the vehicle 100, braking capability, weight of the vehicle 100, a tire state, and a road surface state, the processor 270 may display at least one of the LPB and the LPS changed in real time on the display unit 280.

If it is an alarm time of the vehicle 100, the processor 270 may request that a user perform braking input through at least one of the display unit 280 and the alarm unit 290.

The alarm time refers to a time within a set time starting from a time at which the vehicle 100 reaches the LPB or the LPS.

Figure 15:
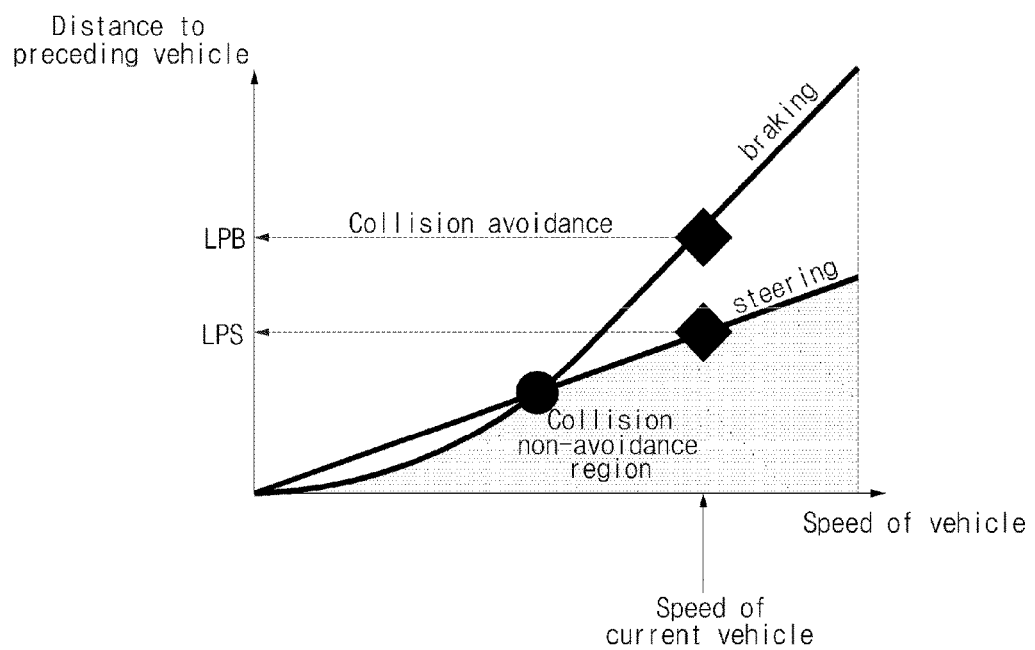
FIG. 15 is a graph illustrating calculation of an LPB and an LPS by a vehicle driving assistance apparatus according to an embodiment of the present invention.

FIG. 15 is a graph illustrating calculation of an LPB and an LPS by a vehicle driving assistance apparatus according to an embodiment of the present invention.

Referring to FIG. 15, there are a line indicating variation of the LPB according to the speed of the vehicle 100 and a line indicating variation of the LPS according to the speed of the vehicle 100.

A speed at a crossing between the line indicating variation of the LPB and the line indicating variation of the LPS may be a set speed.

If the speed of the vehicle 100 is less than the set speed, since the LPS is further separated from a preceding vehicle, the vehicle 100 first reaches the LPS than the LPB.

If the speed of the vehicle 100 is equal to or greater than the set speed, since the LPB is further separated from a preceding vehicle, the vehicle 100 first reaches the LPB than the LPS.

The processor 270 may determine, based on the surrounding situation information, whether the speed of the vehicle 100 is equal to or greater than the set speed.

If the speed of the vehicle 100 is less than the set speed, since the vehicle 100 first reaches the LPS, the processor 270 may display the LPS on the display unit 280.

If the speed of the vehicle 100 is equal to or greater than the set speed, since the vehicle 100 first reaches the LPB, the processor 270 may display the LPB on the display unit 280.

Figure 16:
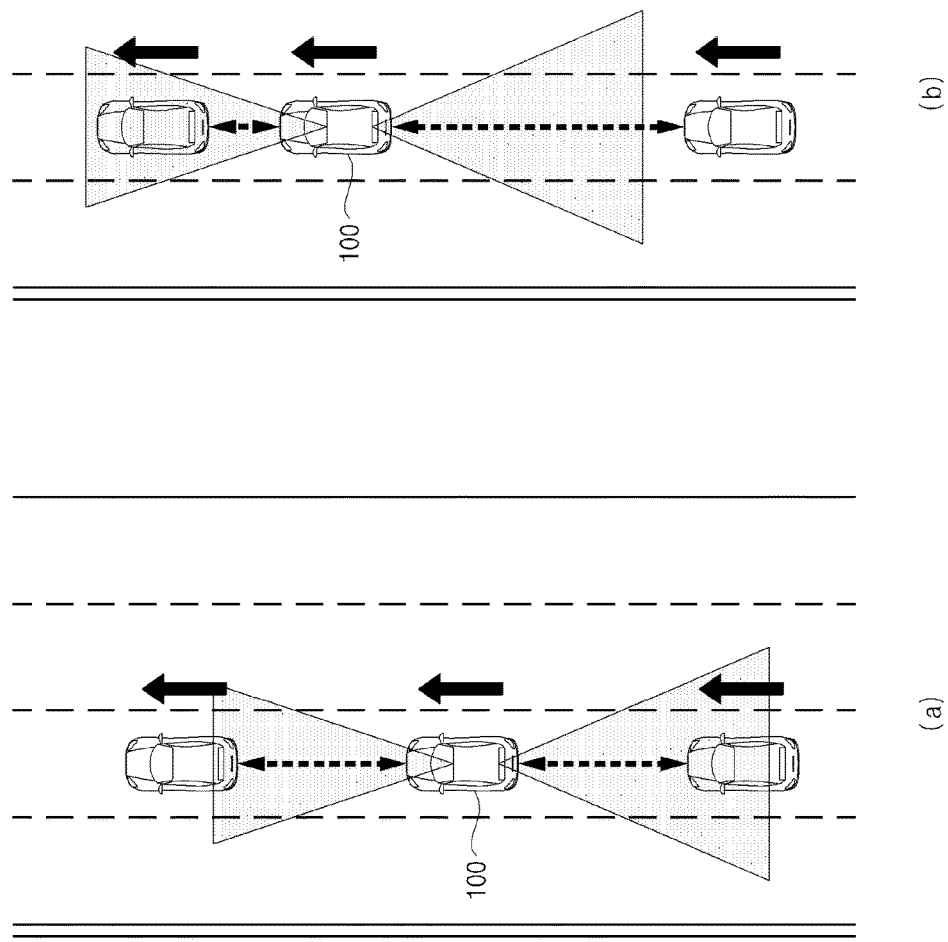
FIG. 16 is a diagram illustrating a situation in which a vehicle driving assistance apparatus reduces a safe distance between a vehicle and a preceding object when a rear object approaches within a rear safe distance according to an embodiment of the present invention.

FIG. 16 is a diagram illustrating a situation in which a vehicle driving assistance apparatus reduces a safe distance between a vehicle and a preceding object when a rear object approaches within a rear safe distance according to an embodiment of the present invention.

Referring to (a) of FIG. 16, the processor 270 may provide a signal for controlling at least one of a steering apparatus, a brake apparatus, and a driving apparatus of the vehicle 100 so that a distance between the vehicle 100 and a preceding object may be maintained at a preset first safe distance while the vehicle 100 travels.

The first safe distance may be a set distance value in order to prevent collision between the vehicle 100 and the preceding object.

The vehicle 100 may travel while maintaining the distance to the preceding object at the first safe distance in correspondence with the signal.

The processor 270 may determine based on the surrounding situation information whether the rear object approaching from the back of vehicle 100 approaches within the rear safe distance.

The rear safe distance may be a distance in order to prevent the vehicle 100 from colliding with the rear object.

If it is determined that the rear object approaches within the rear safe distance from the vehicle 100, the processor 270 may maintain the distance between the vehicle 100 and the preceding object at the second safe distance.

The second safe distance may be less than the first safe distance.

Referring to (b) of FIG. 16, the processor 270 may control the vehicle 100 to maintain the distance between the vehicle 100 and the preceding object at the second safe distance.

If the rear object approaches within the rear safe distance from the back of the vehicle 100, since the vehicle 100 may collide with the rear object, the processor 270 may reduce the distance between the vehicle 100 and the preceding object, thereby preventing collision between the vehicle 100 and the rear object.

As the distance between the vehicle 100 and the preceding object is reduced to the second safe distance from the first safe distance, the distance between the vehicle 100 and the rear object may increase by the rear safe distance or more.

As is apparent from the foregoing description, the embodiments of the present invention have the following one or more effects.

First, when a vehicle stops while traveling, collision with a vehicle approaching from the back can be prevented.

Second, when collision with a rear vehicle cannot be avoided, a vehicle is controlled to have a smaller impulse, so that vehicle damage occurring during collision can be reduced.

Third, when a vehicle stops while traveling, collision which may occur by manipulation of a steering wheel by a driver can be prevented.

Fourth, a guide based on an LPB or an LPS is provided while a vehicle travels, so that a driver can avoid collision with a preceding vehicle.

The effects of the present invention should not be limited to the aforementioned effects and other not-mentioned effects will be clearly understood by those skilled in the art from the claims.

The present invention may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Drive (SSD), a Silicon Disk Drive (SDD), a Read Only Memory (ROM), a Random Access Memory (RAM), a Compact Disk ROM (CD-ROM), a magnetic tape, a floppy disk, an optical data storage, and a carrier wave (e.g., data transmission over the Internet). The computer may include the processor 270 or the controller 170. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A vehicle driving assistance apparatus coupled to a vehicle, comprising:
 a sensing unit configured to sense an object outside the vehicle;
 a display unit; and
 a processor configured to:
  obtain surrounding situation information,
  based on a location of the object outside the vehicle, determine whether the object approaches the vehicle from a traveling lane in which the vehicle is traveling or a lateral lane that is a side lane of the traveling lane,
  based on the determination of whether the object approaches the vehicle from a traveling lane in which the vehicle is traveling or a lateral lane that is a side lane of the traveling lane, generate a control signal that is configured to control at least one of a drive apparatus of the vehicle, a steering apparatus of the vehicle, or a brake apparatus of the vehicle (i) to avoid collision between the vehicle and the object or (ii) to perform an action that reduces an impulse on the vehicle from the collision, and
  provide the control signal to a vehicle control system of the vehicle,
 wherein the processor is further configured to:
  based on the surrounding situation information, determine whether a preceding object of the vehicle exists while the vehicle is traveling,
  based on the surrounding situation information and a determination that the preceding object of the vehicle exists, calculate a Last-Point-to-Brake (LPB) and a Last-Point-to-Steer (LPS), and
  provide one or both of the LPB and the LPS to the display unit.

2. The vehicle driving assistance apparatus of claim 1, wherein the processor is configured to:
 based on the surrounding situation information, determine whether the vehicle stops while the vehicle is traveling,
 based on a determination that the vehicle stops while the vehicle is traveling, generate the control signal that is configured to control at least one of the drive apparatus of the vehicle, the steering apparatus of the vehicle, or the brake apparatus of the vehicle, and
 provide the control signal to the vehicle control system of the vehicle.

3. The vehicle driving assistance apparatus of claim 2, wherein the processor is configured to:
 based on the surrounding situation information, determine, while the vehicle is traveling, (i) whether the vehicle is stopped by an autonomous emergency braking system of the vehicle, (ii) whether braking input is received from a user, or (iii) whether the vehicle collides with the object,
 based on a determination (i) that the vehicle is stopped by the autonomous emergency braking system of the vehicle, (ii) that the braking input is received from the user, or (iii) that the vehicle collides with the object, generate the control signal that is configured to control at least one of the drive apparatus of the vehicle, the steering apparatus of the vehicle, or the brake apparatus of the vehicle, and
 provide the control signal to the vehicle control system of the vehicle.

4. The vehicle driving assistance apparatus of claim 2, wherein the processor is configured to:

based on the surrounding situation information, determine a first probability of collision between the vehicle and a first vehicle that approaches the vehicle from the traveling lane, determine whether the first probability of collision satisfies a first threshold, based on a determination that the first probability of collision satisfies the first threshold, generate the control signal that is configured to control at least one of the drive apparatus of the vehicle, the steering apparatus of the vehicle, or the brake apparatus of the vehicle to move the vehicle from the traveling lane to the lateral lane, and provide the control signal to the vehicle control system of the vehicle.

5. The vehicle driving assistance apparatus of claim 4, wherein the processor is further configured to:

based on the surrounding situation information, determine a second probability of collision between the vehicle and a second vehicle that approaches the vehicle from the lateral lane, determine whether the second probability of collision satisfies a second threshold, based on determinations (i) that the first probability of collision satisfies the first threshold and (ii) that the second probability of collision satisfies the second threshold, generate the control signal that is configured to control at least one of the drive apparatus of the vehicle, the steering apparatus of the vehicle, or the brake apparatus of the vehicle to move the vehicle from the traveling lane to the lateral lane, and provide the control signal to the vehicle control system of the vehicle.

6. The vehicle driving assistance apparatus of claim 5, wherein the processor is configured to:

based on the surrounding situation information, determine a distance between the vehicle and a preceding object of the vehicle, determine whether the distance satisfies a distance threshold, based on (i) a determination that the first probability of collision satisfies the first threshold, (ii) a determination that the second probability of collision satisfies the second threshold, and (iii) a determination that the distance satisfies the distance threshold, generate the control signal that is configured to control at least one of the drive apparatus of the vehicle, the steering apparatus of the vehicle, or the brake apparatus of the vehicle to move the vehicle from the traveling lane to the lateral lane, and provide the control signal to the vehicle control system of the vehicle.

7. The vehicle driving assistance apparatus of claim 6, further comprising:

a communication unit that is configured to communicate with one or more vehicles, wherein the processor is configured to:

based on the surrounding situation information, determine that the preceding object is a preceding vehicle, based on (i) a determination that the second vehicle that approaches the vehicle from the lateral lane has a probability of collision and (ii) a determination that the distance satisfies the distance threshold, generate a notification indicating that the first vehicle approaches the vehicle or a request indicating that the preceding vehicle should move forward, and provide the notification or the request to the preceding vehicle through the communication unit.

8. The vehicle driving assistance apparatus of claim 4, wherein the processor is configured to:

based on the surrounding situation information, determine whether the vehicle moves from the traveling lane to the lateral lane, and based on a determination that the vehicle moves from the traveling lane to the lateral lane, generate the control signal that is configured to control at least one of the drive apparatus of the vehicle, the steering apparatus of the vehicle, or the brake apparatus of the vehicle to block the vehicle from crossing a center line or multiple lanes at once, and provide the control signal to the vehicle control system of the vehicle.

9. The vehicle driving assistance apparatus of claim 2, wherein the processor is configured to:

based on the surrounding situation information, determine a first probability of collision between the vehicle and a first vehicle that approaches the vehicle from the traveling lane, based on the surrounding situation information, determine a second probability of collision between the vehicle and a second vehicle that approaches the vehicle from the lateral lane, based on a determination that the vehicle can only collide with the first vehicle or the second vehicle, generate the control signal that is configured to control at least one of the drive apparatus of the vehicle, the steering apparatus of the vehicle, or the brake apparatus of the vehicle to move the vehicle to a lane from which a vehicle having a smaller impulse, between the first vehicle and the second vehicle that have a probability of collision with the vehicle, approaches, and provide the control signal to the vehicle control system of the vehicle.

10. The vehicle driving assistance apparatus of claim 1, wherein the processor is configured to:

based on the surrounding situation information, determine a first probability of collision between the vehicle and a first vehicle that approaches the vehicle from the lateral lane while the vehicle is stopping, determine whether the first probability of collision satisfies a first threshold, based on a determination that the first probability of collision satisfies the first threshold, generate the control signal that is configured to lock the steering apparatus of the vehicle, and provide the control signal to the vehicle control system of the vehicle.

11. The vehicle driving assistance apparatus of claim 1, further comprising:

an alarm unit that is configured to provide a sound alert or a vibrating alert, wherein the processor is configured to:

based on the surrounding situation information, determine whether the vehicle reaches the LPB, based on a determination that the vehicle reaches the LPB, control, within a first time period from a first time that the vehicle reaches the LPB, (i) the alarm unit to provide, to a user, a first sound alert or a first vibrating alert or (ii) the display unit to provide, to the user, a first visual alert, based on the surrounding situation information, determine whether the vehicle reaches the LPS, based on a determination that the vehicle reaches the LPS, control, within a second time period from a second time that the vehicle reaches the LPS, (i) the alarm unit to provide, to the user, a second sound alert or a second vibrating alert or (ii) the display unit to provide, to the user, a second visual alert.

12. The vehicle driving assistance apparatus of claim 1, wherein the processor is configured to:
based on the surrounding situation information, determine whether a speed of the vehicle is equal or greater than a speed threshold,
based on a determination that the speed of the vehicle is equal or greater than the speed threshold, control the display unit to display the LPB, and
based on a determination that the speed of the vehicle is less than the speed threshold, control the display unit to display the LPS.

13. The vehicle driving assistance apparatus of claim 1, wherein the processor is configured to:
based on the surrounding situation information, determine a first probability of collision between the vehicle and a first vehicle that approaches the vehicle from the lateral lane,
determine whether the first probability of collision satisfies a first threshold, and
based on a determination that the first probability of collision satisfies the first threshold, control the display unit to display only the LPB.

14. The vehicle driving assistance apparatus of claim 1, wherein the processor is configured to:
based on the surrounding situation information, determine whether the vehicle reaches the LPB,
based on a determination that the vehicle reaches the LPB, generate the control signal that is configured to control at least one of the drive apparatus of the vehicle, the steering apparatus of the vehicle, or the brake apparatus of the vehicle to stop the vehicle in the traveling lane,
based on the surrounding situation information, determine whether the vehicle reaches the LPS,
based on a determination that the vehicle reaches the LPS, generate the control signal that is configured to control at least one of the drive apparatus of the vehicle, the steering apparatus of the vehicle, or the brake apparatus of the vehicle to move the vehicle from the traveling lane to the lateral lane, and
provide the control signal to the vehicle control system of the vehicle.

15. The vehicle driving assistance apparatus of claim 1, wherein the processor is configured to:
provide the control signal that is configured to control at least one of a drive apparatus of the vehicle, a steering apparatus of the vehicle, and/or a brake apparatus of the vehicle to maintain a distance between the vehicle and a preceding object of the vehicle at a preset first safe distance from the vehicle,
based on the surrounding situation information, determine whether a rear object approaching from the traveling lane approaches within a rear safe distance from the vehicle, and
based on a determination that the rear object approaching from the traveling lane approaches within the rear safe distance from the vehicle, adjust the distance between the vehicle and the preceding object to a second safe distance less than the first safe distance.

16. A vehicle driving assistance comprising:
a sensing unit configured to sense an object outside the vehicle;
a display unit; and
a processor configured to:
obtain surrounding situation information,
based on a location of the object outside the vehicle, determine whether the object approaches the vehicle from a traveling lane in which the vehicle is traveling or a lateral lane that is a side lane of the traveling lane,
based on the determination of whether the object approaches the vehicle from a traveling lane in which the vehicle is traveling or a lateral lane that is a side lane of the traveling lane, generate a control signal that is configured to control at least one of a drive apparatus of the vehicle, a steering apparatus of the vehicle, or a brake apparatus of the vehicle (i) to avoid collision between the vehicle and the object or (ii) to perform an action that reduces an impulse on the vehicle from the collision, and
provide the control signal to a vehicle control system of the vehicle,
wherein the processor further is configured to:
based on the surrounding situation information, determine whether the vehicle stops while the vehicle is traveling,
based on a determination that the vehicle stops while the vehicle is traveling, generate the control signal that is configured to control at least one of the drive apparatus of the vehicle, the steering apparatus of the vehicle, or the brake apparatus of the vehicle, and
provide the control signal to the vehicle control system of the vehicle,
wherein the processor is further configured to:
based on the surrounding situation information, determine whether the vehicle moves to the lateral lane while the vehicle is stopping,
based on a determination that the vehicle moves to the lateral lane while the vehicle is stopping, generate the control signal that is configured to control at least one of the drive apparatus of the vehicle, the steering apparatus of the vehicle, or the brake apparatus of the vehicle to return the vehicle to the traveling lane, and
provide the control signal to the vehicle control system of the vehicle.

17. The vehicle driving assistance apparatus of claim 16, wherein the processor is configured to:
based on the surrounding situation information, determine a first probability of collision between the vehicle and a first vehicle that approaches the vehicle from the lateral lane,
determine whether the first probability of collision satisfies a first threshold,
based on a determination that the first probability of collision satisfies the first threshold, generate the control signal that is configured to control at least one of the drive apparatus of the vehicle, the steering apparatus of the vehicle, or the brake apparatus of the vehicle to return the vehicle to the traveling lane, and
provide the control signal to the vehicle control system of the vehicle.

18. The vehicle driving assistance apparatus of claim 17, wherein the processor is configured to:
based on the surrounding situation information, determine a distance between the vehicle and a preceding object of the vehicle,
determine whether the distance satisfies a distance threshold, based on (i) a determination that the first probability of collision satisfies the first threshold and (ii) a determination that the distance satisfies the distance threshold, generate the control signal that is configured to control at least one of the drive apparatus of the vehicle, the steering apparatus of the vehicle, or the brake apparatus of the vehicle to return the vehicle to the traveling lane, and provide the control signal to the vehicle control system of the vehicle.

19. The vehicle driving assistance apparatus of claim 18, wherein the processor is configured to:

based on the surrounding situation information, determine a second probability of collision between the vehicle and a second vehicle that approaches the vehicle from the traveling lane determine whether the second probability of collision satisfies a second threshold, based on (i) a determination that the first probability of collision satisfies the first threshold, (ii) a determination that the distance satisfies the distance threshold, and (iii) a determination that the second probability of collision satisfies the second threshold, generate the control signal that is configured to control at least one of the drive apparatus of the vehicle, the steering apparatus of the vehicle, or the brake apparatus of the vehicle to return the vehicle to the traveling lane, and provide the control signal to the vehicle control system of the vehicle.

20. The vehicle driving assistance apparatus of claim 18, further comprising:

a communication unit that is configured to communicate with one or more vehicles, wherein the processor is configured to:

based on the surrounding situation information, determine that the preceding object is a preceding vehicle, based on (i) a determination that the first probability of collision satisfies the first threshold and (ii) a determination that the distance satisfies the distance threshold, generate a notification indicating that the first vehicle approaches the vehicle or a request indicating that the preceding vehicle should move forward, and provide the notification or the request to the preceding vehicle through the communication unit.

21. The vehicle driving assistance apparatus of claim 16, wherein the processor is configured to:

based on the surrounding situation information, determine whether a third vehicle approaching the vehicle from the lateral lane exists, based on the surrounding situation information, determine a second probability of collision between the vehicle and a second vehicle that approaches the vehicle from the traveling lane, determine whether the second probability of collision satisfies a second threshold, based on (i) a determination that the third vehicle approaching the vehicle from the lateral lane exists and (ii) a determination that the second probability of collision satisfies the second threshold, generate the control signal that is configured to control at least one of the drive apparatus of the vehicle, the steering apparatus of the vehicle, or the brake apparatus of the vehicle to move the vehicle from the traveling lane to the lateral lane, and provide the control signal to the vehicle control system of the vehicle.

* * * * *